United States Patent
Niigaki et al.

(10) Patent No.: US 11,922,650 B2
(45) Date of Patent: Mar. 5, 2024

(54) POINT CLOUD ANALYSIS DEVICE, ESTIMATION DEVICE, POINT CLOUD ANALYSIS METHOD, AND PROGRAM

(71) Applicant: NIPPON TELEGRAPH AND TELEPHONE CORPORATION, Tokyo (JP)

(72) Inventors: Hitoshi Niigaki, Tokyo (JP); Masaki Waki, Tokyo (JP); Masaaki Inoue, Tokyo (JP); Yasuhiro Yao, Tokyo (JP); Tomoya Shimizu, Tokyo (JP); Hiroyuki Oshida, Tokyo (JP); Kana Kurata, Tokyo (JP); Shingo Ando, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 141 days.

(21) Appl. No.: 17/608,975

(22) PCT Filed: May 8, 2019

(86) PCT No.: PCT/JP2019/018450
§ 371 (c)(1),
(2) Date: Nov. 4, 2021

(87) PCT Pub. No.: WO2020/225887
PCT Pub. Date: Nov. 12, 2020

(65) Prior Publication Data
US 2022/0230347 A1 Jul. 21, 2022

(51) Int. Cl.
*G06T 7/66* (2017.01)
*G06V 10/25* (2022.01)
*G06V 10/75* (2022.01)

(52) U.S. Cl.
CPC .............. *G06T 7/66* (2017.01); *G06V 10/25* (2022.01); *G06V 10/755* (2022.01); *G06T 2207/10028* (2013.01)

(58) Field of Classification Search
CPC ............ G06T 7/66; G06T 2207/10028; G06T 2207/30184; G06T 7/001; G06V 10/25;
(Continued)

(56) References Cited

U.S. PATENT DOCUMENTS

2005/0238244 A1   10/2005   Uzawa

FOREIGN PATENT DOCUMENTS

| JP | 2005141346 A | 6/2005 |
| JP | 2005346137 A | 12/2005 |
| JP | 2011170481 A | 9/2011 |

OTHER PUBLICATIONS

Chen, C., Yang, B., Song, S., Peng, X. and Huang, R., 2018. Automatic clearance anomaly detection for transmission line corridors utilizing UAV-Borne LIDAR data. Remote Sensing, 10(4), p. 613.*

(Continued)

*Primary Examiner* — Zhitong Chen

(57) ABSTRACT

It is possible to estimate a slack level accurately in consideration of a shape of a deformed cable. A point cloud analysis device sets a plurality of regions of interest obtained by window-searching a wire model including a quadratic curve model representing a cable obtained from a point cloud consisting of three-dimensional points on an object, the region of interest being divided into a first region and a second region. The point cloud analysis device compares information on the first region with information on the second region based on the point cloud included in the region of interest and the quadratic curve model for each of the plurality of regions of interest, calculates a degree of division boundary representing a degree to which a division (Continued)

position between the first region and the second region of the plurality of regions of interest is a branch point of the cable, and detects a division boundary point that is a branch point of a cable represented by the quadratic curve model based on the degree of division boundary calculated for each of the plurality of regions of interest.

20 Claims, 17 Drawing Sheets

(58) Field of Classification Search
CPC .. G06V 10/755; G06V 10/471; G06V 20/182; G06V 20/176
See application file for complete search history.

(56) References Cited

OTHER PUBLICATIONS

Woo, H., Kang, E., Wang, S. and Lee, K.H., 2002. A new segmentation method for point cloud data. International Journal of Machine Tools and Manufacture, 42(2), pp. 167-178.*

Yamamoto et al. (1957) "Suspension Angle Measuring Clinometer for Transmission Lines" Hitachi critique, vol. 39, No. 3 [online] website: http://www.hitachihyoron.com/jp/pdf/1957/03/1957_03_11.pdf.

Sohn et al. (2012) "Automatic powerline scene classification and reconstruction using airborne lidar data" ISPRS Annals of the Photogrammetry, Remote Sensing and Spatial Information Sciences, vol. 1-3, pp. 167-172.

* cited by examiner

POINT CLOUD ANALYSIS DEVICE, ESTIMATION DEVICE, POINT CLOUD ANALYSIS METHOD, AND PROGRAM

CROSS-REFERENCE TO RELATED APPLICATIONS

This application is a U.S. National Stage Application filed under 35 U.S.C. § 371 claiming priority to Application of International Patent Application No. PCT/JP2019/018450, filed on May 8, 2019, the disclosure of which is hereby incorporated herein by reference in its entirety.

TECHNICAL FIELD

The present invention relates to a point cloud analysis device, an estimation device, a point cloud analysis method, and a program, and more particularly, to a point cloud analysis device, an estimation device, a point cloud analysis method, and a program that model a linear structure from a point cloud consisting of three-dimensional points.

BACKGROUND ART

There are a very large number of power and communication infrastructure facilities, and companies and local governments need to perform maintenance work on the facilities on a regular basis in order to ensure the safety of the facilities. For example, in utility pole inspection items, a situation regarding the generation of cracks or an amount of warping are checked regarding the deterioration and deformation of utility poles. Warping means deformation in which a shape of a utility pole bends when a tensile load of a cable is unbalanced (a magnitude of resultant forces is not 0), that is, when a large force is applied in a specific direction. With progression in a situation of warping or bending, there is concern that a utility pole may eventually collapse. In order to prevent this, it is necessary to regularly check a tensile load that causes further warping while checking a situation of warping or cracking of the utility pole in a periodic inspection.

Here, there is a technology for calculating a tensile load applied to a utility pole based on a slack level of the cable (Non Patent Literature 1). With this technology, it is possible to calculate a horizontal tension at an endpoint position of the cable based on the slack level, a density, and the endpoint position of the cable. Further, a tensile tension can be calculated from a tangential direction of the cable at the endpoint position.

However, in the related art, it is necessary to perform work in the field in order to measure this slack level. Because there are a huge number of external facilities and a range in which the facilities are present is large, there is a problem of requiring a huge amount of operation of maintenance work.

Meanwhile, in recent years, use of a system capable of measuring a shape of a surface of an object such as a building or a road that is a structure around a road by a vehicle with a camera or a laser scanner, called a mobile mapping system (MMS), traveling around a city has become widespread. This system can record the surface of the object as three-dimensional coordinate information using a Global Positioning System (GPS) or an inertial measurement unit (IMS). Applications using this technology in automatic estimation of a status of an infrastructure facility are expected. Here, the three-dimensional coordinate information is three-dimensional coordinate information corresponding to a position in a real space, and a relative position in the coordinate information corresponds to a positional relationship in the real space.

The MMS travels outdoors and laser measurement is performed such that a surface shape of an infrastructure structure (hereinafter referred to as a subject) can be recorded with millimeter-level accuracy, and the cable is approximated to a quadratic curve (a catenary curve, a parabolic curve, or the like) as in Non Patent Literature 2, such that it is possible to accurately calculate a value of a slack level regardless of the presence or absence of a loss of measured point clouds.

In this technology, a point cloud on the cable is detected from measured point clouds and a quadratic curve model is fitted to the point cloud on the cable such that a shape of the cable can be estimated as a model parameter. In the estimated model shape, a maximum value of a difference value in a vertical direction (a Z-axis direction) between a line segment connecting endpoints and the model is obtained to be a slack level. When values of two endpoints in the Z-axis direction differ, the slack level is also called a diagonal slack level, but hereinafter, both are represented as a slack level.

The slack level can be obtained from measured point cloud information by measuring the point cloud through a manual operation, but the slack level at a loss position cannot be measured. However, modeling makes it possible to estimate the slack level robustly in response to the influence of not only a loss of a measurement point cloud but also a large measurement error of the MMS occurring at a part of positions. The measurement error, for example, for a point cloud subjected to laser measurement is caused by a measurement error of several centimeters due to vibration of a vehicle or noise such as water droplets or dust in the air.

CITATION LIST

Non Patent Literature

Non Patent Literature 1: Yamamoto, Kaneko, Owa, "Suspension Angle Measuring Clinometer for Transmission Lines", Hitachi Review 39 (3), 1957-03, URL: http://www.hitachihyoron.com/jp/pdf/1957/03/1957_03_11.pdf Non Patent Literature 2: G. Sohn, Y. Jwa, and H. B. Kim, AUTOMATIC POWERLINE SCENE CLASSIFICATION AND RECONSTRUCTION USING AIRBORNE LIDAR DATA, SPRS Ann. Photogramm. Remote Sens. Spatial Inf. Sci., I-3, 167-172, 2012

SUMMARY OF THE INVENTION

Technical Problem

However, a cable laid in a city region may have a service line, an intermediate branch, or the like connected thereto, and the cable itself also has a tensile load and thus, a shape of the cable deviates from a quadratic curve such as a catenary or a parabola curve. FIG. 1 is an image diagram illustrating an estimated slack level d1 at the time of fitting a catenary curve to a point cloud subjected to laser measurement and an actual slack level d2 of a deformed cable. A and B in FIG. 1 represent two endpoints of a cable connected to a utility pole, and solid circles represent point clouds subjected to laser measurement. In FIG. 1, an alternate long and short dash line represents a shape of the cable when there is no tension (concentrated load) from a service line. As illustrated in FIG. 1, when model fitting is performed on the measured point cloud to estimate the slack level d1 without considering the deformation and tension is calculated based on the slack level, an erroneous tension is obtained. That is, when a concentrated load such as a tensile load is generated, an erroneous slack level and tension are calculated using a scheme of the related art.

The present invention has been made in view of the above circumstances, and an object of the present invention is to provide a point cloud analysis device, an estimation device, a point cloud analysis method, and a program capable of accurately estimating a slack level and a tension in consideration of a shape of a deformed cable.

Means for Solving the Problem

In order to achieve the above object, a point cloud analysis device according to a first aspect includes a region-of-interest setting unit configured to set a plurality of regions of interest obtained by window-searching a wire model including a quadratic curve model representing a cable obtained from a point cloud consisting of three-dimensional points on an object, the region of interest being divided into a first region and a second region; and a boundary point detection unit configured to compare information on the first region with information on the second region based on a point cloud included in the region of interest and the quadratic curve model for each of the plurality of regions of interest, calculate a degree of division boundary representing a degree to which a division position between the first region and the second region of each of the plurality of regions of interest is a branch point of the cable, and detect a division boundary point that is a branch point of a cable represented by the wire model based on the degree of division boundary calculated for each of the plurality of regions of interest.

A point cloud analysis method according to a second aspect includes setting, by a region-of-interest setting unit, a plurality of regions of interest obtained by window-searching a wire model including a quadratic curve model representing a cable obtained from a point cloud consisting of three-dimensional points on an object, the region of interest being divided into a first region and a second region; and detecting, by a boundary point detection unit, a division boundary point that is a branch point of a cable represented by the quadratic curve model based on a degree of division boundary calculated for each of the plurality of regions of interest by comparing information on the first region with information on the second region based on a point cloud included in the region of interest and the quadratic curve model for each of the plurality of regions of interest, and calculating the degree of division boundary representing a degree to which a division position between the first region and the second region of each of the plurality of regions of interest is a branch point of the cable.

A program according to a third aspect is a program for causing a computer to execute: setting a plurality of regions of interest obtained by window-searching a wire model including a quadratic curve model representing a cable obtained from a point cloud consisting of three-dimensional points on an object, the region of interest being divided into a first region and a second region; and detecting a division boundary point that is a branch point of a cable represented by the quadratic curve model based on a degree of division boundary calculated for each of the plurality of regions of interest by comparing information on the first region with information on the second region based on a point cloud included in the region of interest and the quadratic curve model for each of the plurality of regions of interest, and calculating the degree of division boundary representing a degree to which a division position between the first region and the second region of each of the plurality of regions of interest is a branch point of the cable.

An estimation device according to a fourth aspect is an estimation device for estimating a position on a cable hung between two points to which a force deforming a slack level of the cable is applied, the estimation device comprising: a calculation unit configured to set a candidate for the position as a reference and calculate a degree to which the candidate for the position is the position from a first region included in a region on one side of the reference and a second region included in a region on the other side of the reference, wherein the degree is obtained based on at least one of an error between the second region and a region estimated to be the second region from the first region, and an error between the first region and a region estimated to be the first region from the second region.

Effects of the Invention

According to the point cloud analysis device, the estimation device, the point cloud analysis method, and the program of the present invention, it is possible to obtain an effect that the slack level can be estimated accurately in consideration of the shape of the deformed cable.

DESCRIPTION OF EMBODIMENTS

Hereinafter, embodiments of the present invention will be described in detail with reference to the drawings.

A scheme according to the embodiment of the present invention is a technology for estimating a slack level of a cable hung between utility poles from a detected point cloud. The slack level is a difference (distance) in height between a cable support point and the lowest point of a curve formed by an electric wire. It is possible to estimate a horizontal tension that is applied to the utility pole based on the slack level. The point cloud is an example and the present invention can be applied to other detection targets.

First, a principle of estimation of the slack level, which is the premise of the embodiment of the present invention, will be briefly described.

Figure 2:
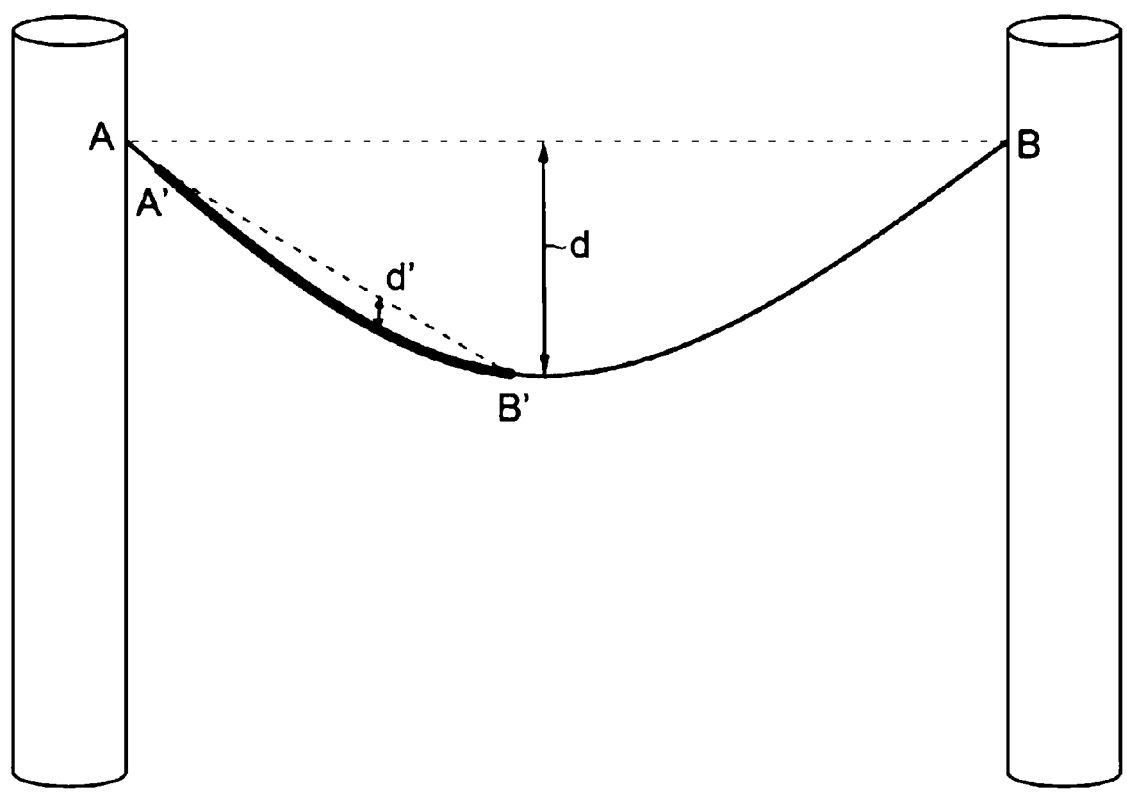
FIG. 2 is a diagram illustrating an example illustrating a slack level of a cable hung between two utility poles.

FIG. 2 is a diagram illustrating an example illustrating a slack level of a cable hung between two utility poles.

As illustrated in FIG. 2, a load applied to the utility pole is visualized by the slack level. Assuming that a load [N] per length is W and a horizontal distance between support points is S [m] (a length when a cable is projected onto the ground), a slack level d [m] in Equation (1) below is measured such that a horizontal tension T [N] can be calculated. It is known that a catenary curve can be sufficiently approximated as a parabolic curve when Taylor expansion is performed near an origin, and the slack level d can be obtained by Equation (1) below.

[Math. 1]

$$d \approx \frac{WS^2}{8T} \tag{1}$$

The horizontal tension T can be approximated by Equation (2) below.

[Math. 2]

$$T \approx \frac{WS^2}{8d} = \frac{WS'^2}{8d'} \tag{2}$$

Here, d' is a line segment connecting any two points A' and B' on the cable and a diagonal slack level of the cable when S' is a horizontal distance between the points A' and B' (a distance at the time of projection onto a ground XY plane). That is, this means that a value of S'=(S/2) is input so that a tension that is applied to endpoints A and B is estimated from the slack level measured at any positions of A' and B'.

Figure 1:
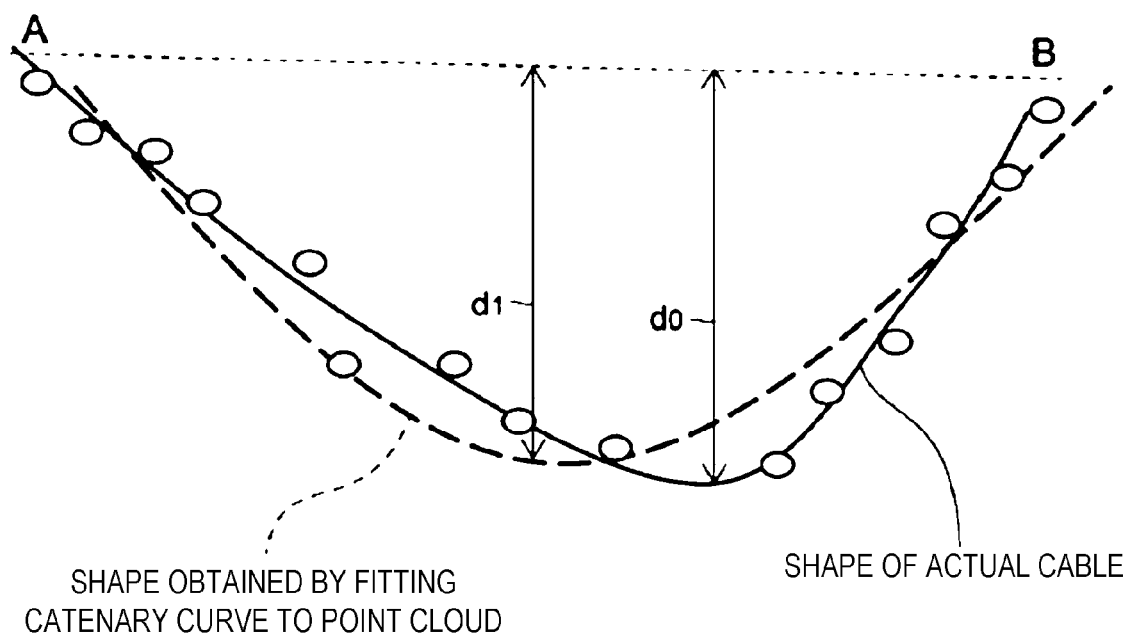
FIG. 1 is an image diagram illustrating an actual slack level d2 of a deformed cable. A and B represent endpoints of the cable, and solid circles represent three-dimensional points.
Figure 3:
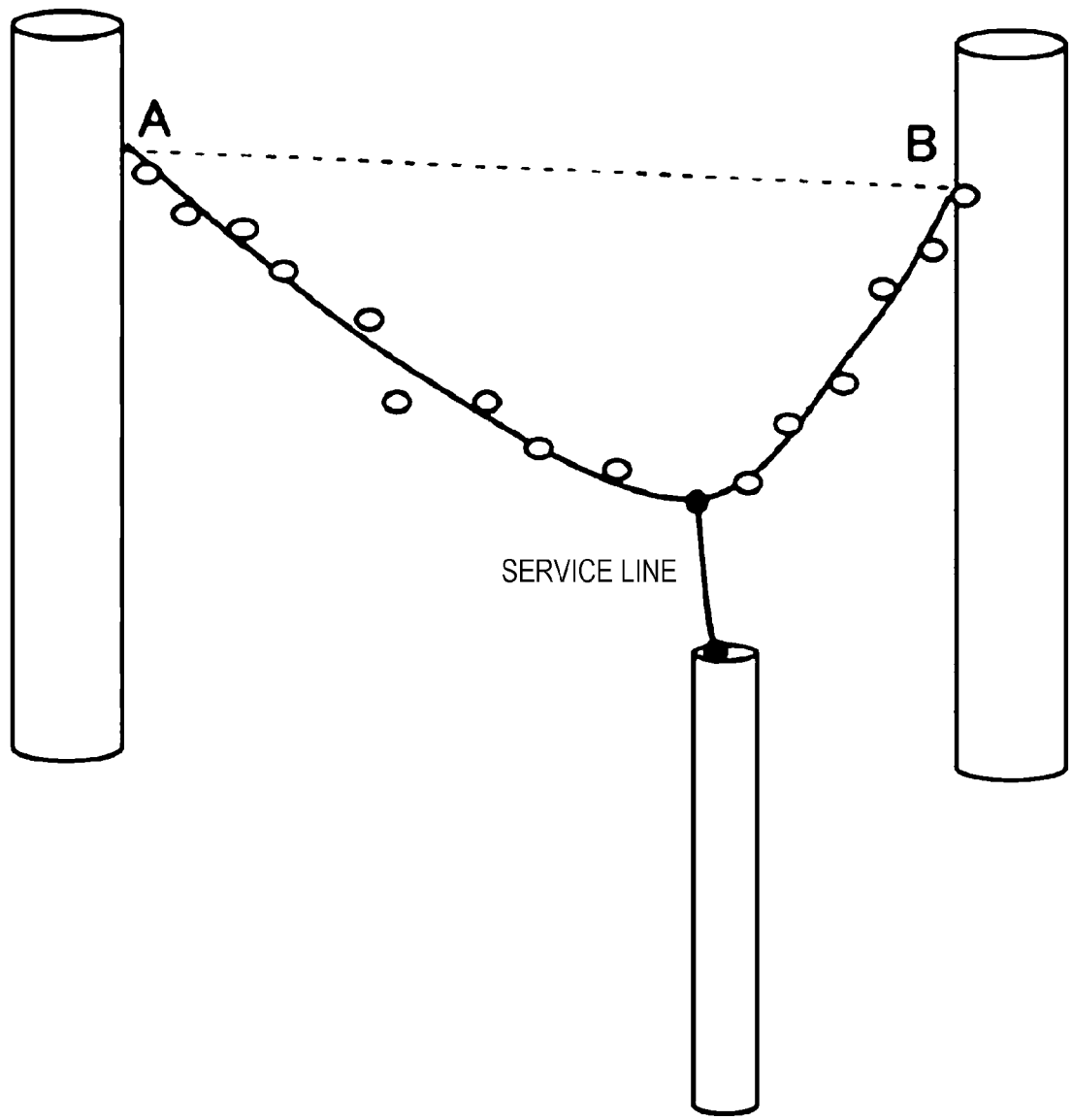
FIG. 3 is an image diagram in which deformation due to a concentrated load is exaggerated as an example of a deformed cable.

However, as illustrated in FIG. 3, when a load is applied to the cable from the outside, a shape of the cable is deformed from a catenary shape. FIG. 3 is an image diagram in which deformation due to a concentrated load is exaggerated as an example of a deformed cable. Even when the catenary model is fitted to the point cloud in which a cable between utility poles is detected by MMS, a fitting accuracy is poor. That is, as illustrated in FIG. 1, there is a deviation between the fitted model and the actual cable shape, and a correct horizontal tension cannot be calculated using the slack level estimated from the catenary model.

Equation (2) for obtaining a horizontal tension does not consider deformation of the shape of the cable due to the influence of a force (concentrated load) of a service line or the like other than a weight of the cable, and cannot be applied as a slack level estimation equation when a concentrated load is applied.

Thus, in the embodiment of the present invention, the cable is represented as a plurality of continuous curve models that are piecewise smooth (differentiable) to cope with any cable shape in consideration of deformation due to a concentrated load. Because a deformed shape is generated with a tensioned portion set as a boundary, the cable is divided into regions before and after a boundary position, and each separate region is modeled as a quadratic curve so that a location in which the concentrated load is generated is specified based on the model and a slack level and a tension are estimated in the embodiment of the present invention.

Figure 4:
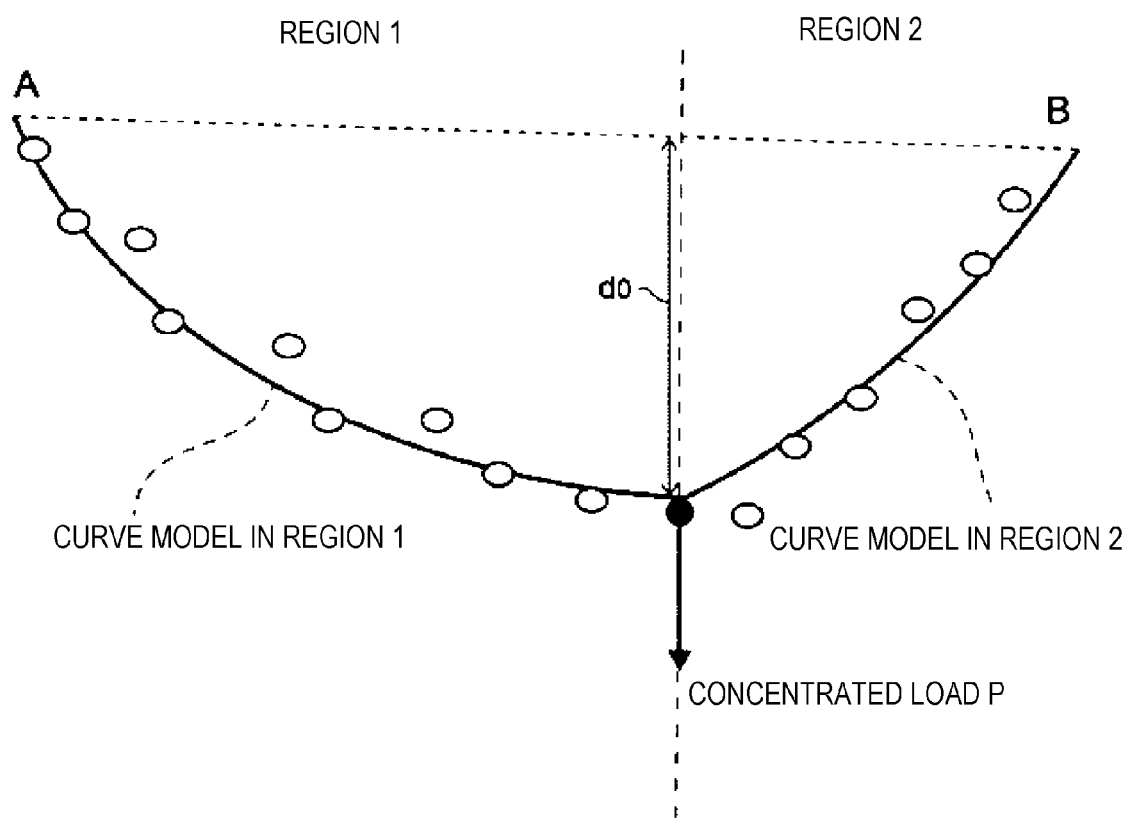
FIG. 4 is an image diagram in which an alternate long and short dash line serves as a boundary between regions as an example in which a cable is modeled for each of two regions.

That is, the cable is divided based on a position at which a tension that causes deformation is generated (hereinafter referred to as a division boundary point), and approximation to a curve model is performed for each divided region. FIG. 4 is an image diagram in which an alternate long and short dash line serves as a boundary of regions as an example of modeling a cable for each of two regions.

Figure 5:
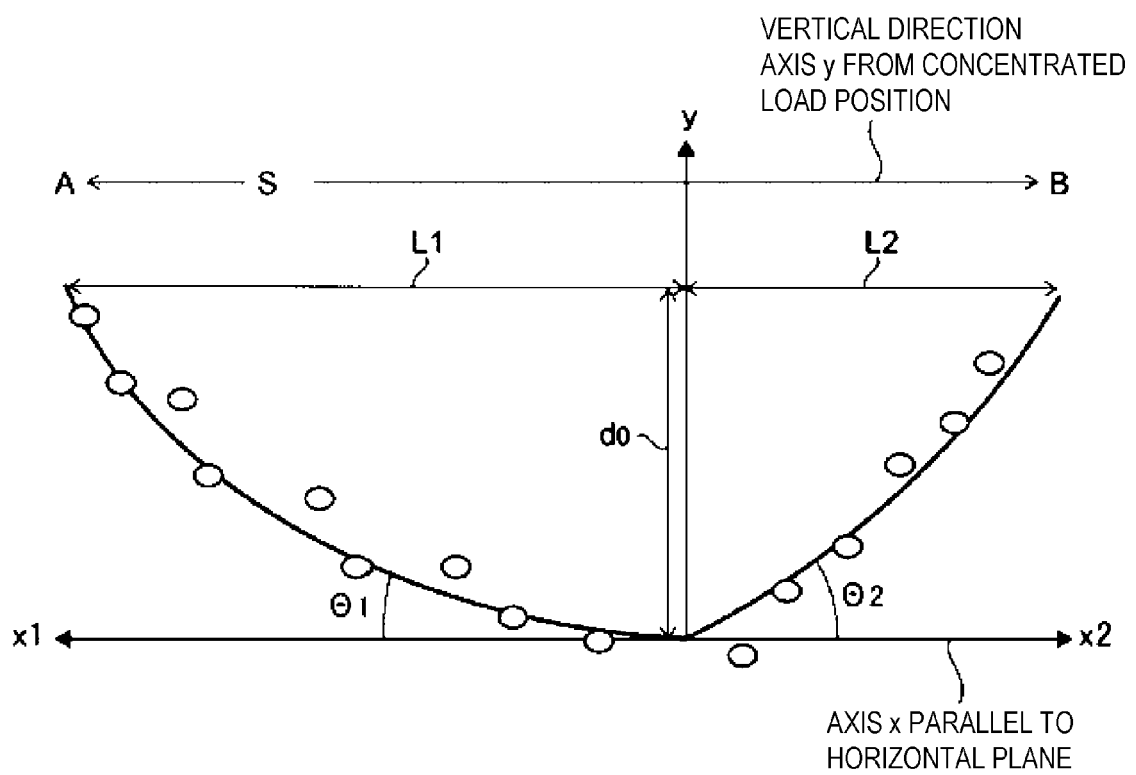
FIG. 5 is a diagram illustrating an example in which a slack level is calculated for each of two regions.

FIG. 5 is a diagram illustrating an example in which the slack level is calculated for each of the two regions. A concentrated load position Q is set as an origin, an axis parallel to the ground is set to X, an axis in a vertical direction is set to Y, and the horizontal tension is calculated based on the slack level estimated for each of sections thereof as follows.

For a region on the left side of FIG. 5, the cable shape is expressed by Equation (2-1) below.

[Math. 3]

$$y = x \cdot \tan \theta_1 + W/2Tx^2 \tag{2-1}$$

When a distance L1 from the origin at the endpoint A and the slack level d2 are input, Equation (2-2) below is derived.

[Math. 4]

$$d = x \cdot \tan \theta_1 + w/2L_1^2 \tag{2-2}$$

Similarly, for a region on the right side of FIG. 5, the cable shape is expressed by Equations (2-3) and (2-4) below.

[Math. 5]

$$y = -x \cdot \tan \theta_2 + w/2T x^2 \tag{2-3}$$

[Math. 6]

$$d = x \cdot \tan \theta_1 + w/2T L_2^2 \tag{2-4}$$

Further, considering the balance of forces at the origin Q, Equation (2-5) is established.

[Math. 7]

$$P = (\tan \theta_1 + \tan \theta_2) \cdot T \tag{2-5}$$

Summarizing these equations, the horizontal tension T and the slack level d0 can be obtained by Equation (2-6) below, in which a distance between A and B is S(=L1+L2).

[Math. 8]

$$T = L_1 \cdot L_2 / 2Sd \cdot (2P + WS) \quad (2\text{-}6)$$

Using this equation, it is possible to calculate the tension T by obtaining the concentrated load position Q and a magnitude P of the concentrated load. However, it is often difficult to measure a concentrated load P during field work, and in this case, it is necessary to obtain the concentrated load P and the position Q at the same time.

When a magnitude of the concentrated load P is unknown, the magnitude is estimated from a shape of the quadratic curve model fitted to the point cloud. An equation of the cable shape with the position Q of the concentrated load set as an origin can be expressed by Equation (2-7) below when written as a generalized equation with tan θ, load W, and tension T as α and β.

[Math. 9]

$$y = \alpha \cdot x + \beta \cdot x^2 \quad (2\text{-}7)$$

This coefficient α represents the influence of a shape deformation amount of the cable after the concentrated load is generated, and the coefficient β represents an item of a deformation amount due to the weight of the cable in each region after the concentrated load is generated. This means that, when coefficients of this equation are obtained directly, the tension and the slack level can be directly estimated even when the magnitude of the concentrated load P is unknown.

That is, the coefficients α and β may be obtained directly from coordinate values x and y when a three-dimensional point cloud obtained by measuring the cable is projected onto a plane ABQ. It is known that the coefficients can be solved as a regression problem through numerical analysis. For example, the coefficients can be obtained through a process such as the least squares method or RANSAC.

Focusing on region 2, when the estimated coefficients are expressed as $\alpha_0$ and $\beta_0$, the slack level d and the horizontal tension T are obtained by equations (3-1) and (3-2) below.

[Math. 10]

$$d = \alpha_0 \cdot L_2 + \beta_0 \cdot L_2^2 \quad (3\text{-}1)$$

$$T = W / 2\alpha_0 \quad (3\text{-}2)$$

Hereinafter, a detailed description of a way of obtaining the position Q as the origin will be described.

As shown above, it is important to divide the region of the cable at the time of estimating the tension, but in the embodiment of the present invention, the boundary position at the time of division into regions is hereinafter referred to as a division boundary point. When a slack level required for calculation of the tension of the cable is calculated, a position division boundary point at which tension is generated for the cable is searched for, and the cable is represented as a piecewise continuous curve based on a result of the search, and a slack level in each section is estimated.

As can be seen from the above description, it is possible to estimate the slack level and the tension when two support points and one concentrated load point (in short, an amount of deformation) are known. As a premise, deformation occurs when external force is applied due to, for example, branching of a cable. Thus, when a location to which the external force is applied can be estimated, the amount of deformation can be estimated. Thus, in a scheme that will be described below, the location to which the external force is applied is set as a branch boundary point, and a distance between a shape likeness of an arbitrary section estimated from, for example, an adjacent section of the arbitrary section and an actual shape of the arbitrary section is used as an index in order to search for the branch boundary point.

Figure 6:
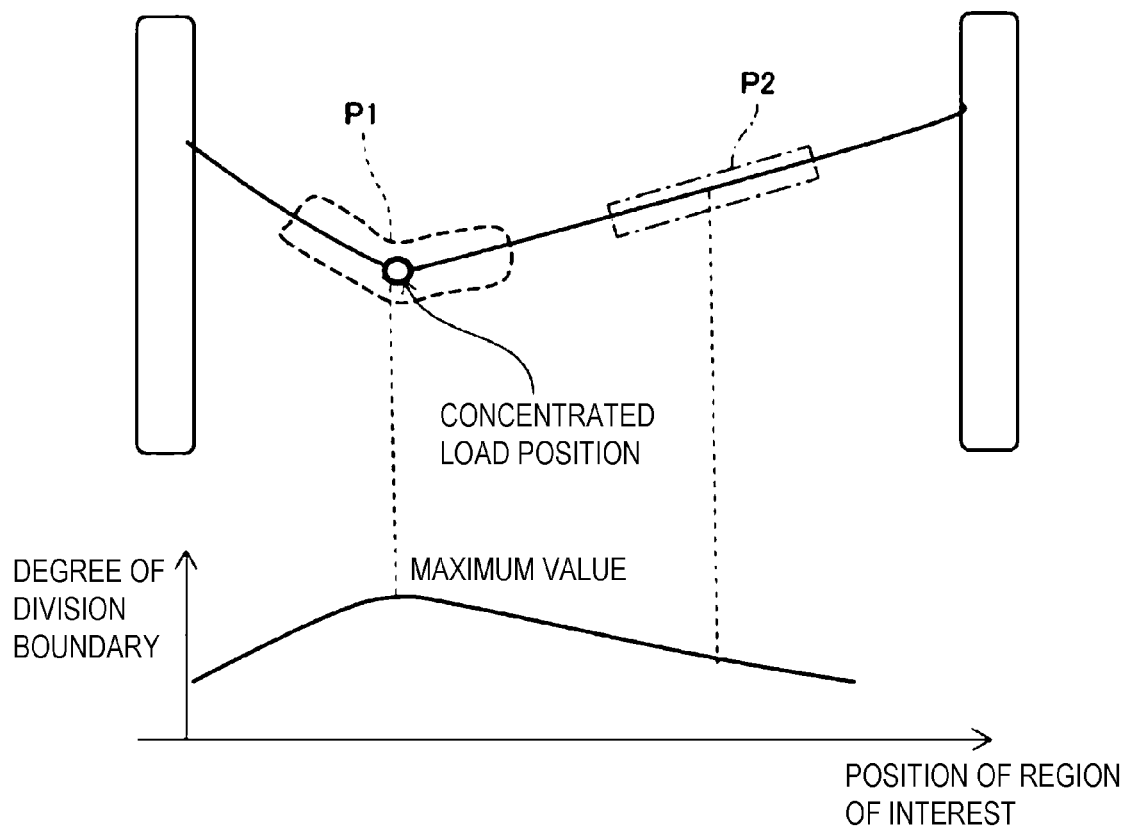
FIG. 6 is an image diagram of a degree of division boundary at a position of a region of interest set on a cable.

FIG. 6 is an image diagram of a degree of division boundary at a position of the region of interest set on the cable. This is a diagram schematically illustrating a relationship between a magnitude of a possibility of a division boundary point being present and a cable position for a cable hung between utility poles that is deformed due to a tensile load at two places.

In the embodiment of the present invention, the degree of division boundary is obtained to use an index indicating an increase in the degree of division boundary at a load generation position. Specifically, as illustrated in FIG. 6, in two regions with the position $Q_i$ of interest on the cable set as a boundary, model parameters in the respective regions are estimated, and a possibility (likelihood) of division is considered to be higher when a correlation of the parameters in the respective regions is lower. As illustrated in FIG. 6, for the degree of division boundary, a position of the peak (maximum value) of the degree of division boundary becomes the concentrated load position, and the branch point exists.

Here, the model parameters to be estimated are all model parameters in the divided region. For example, when there are three division boundary points, four models can be obtained. Because the model parameters are obtained from data (point cloud) having X, Y, and Z coordinate values, the model parameter is a concept including a direction as a result. An angle between a vertical direction and the model (a plane on which the quadratic curve is present), that is, a tilt direction of the model with respect to a horizontal plane can be seen from the model parameter. Further, when there are the model parameter and a ground point cloud, a minimum ground height from the ground or a three-dimensional position that is a minimum ground can also be obtained.

When no tensile load is generated, a certain region can be accurately approximated to a quadratic curve model. However, when deformation occurs due to a tension, a shape of the region deviates and thus, the region cannot be represented by one quadratic curve model, and it is necessary to perform curve approximation with a position thereof set as a boundary. Thus, it is possible to estimate a division boundary point position by checking whether or not the approximation accuracy is higher when the region is modeled separately.

Further, because deformation occurs, a nearby cable (service line) causing the deformation is highly likely to be measured. Thus, in the embodiment, not only the cable of interest but also a positional relationship with surrounding structures is considered so that the degree of division boundary position is estimated with higher accuracy.

Here, as illustrated in FIG. 4, two regions (a certain range) are set without the cable being divided into two regions with a boundary point candidate position set as a boundary because the number of positions at which a load is generated in a certain cable of interest is not limited to one. As illustrated in FIG. 6, it is necessary to set the region in consideration of a possibility of two division boundary points being present.

First Embodiment

Configuration of Point Cloud Analysis Device According to First Embodiment

Figure 7:
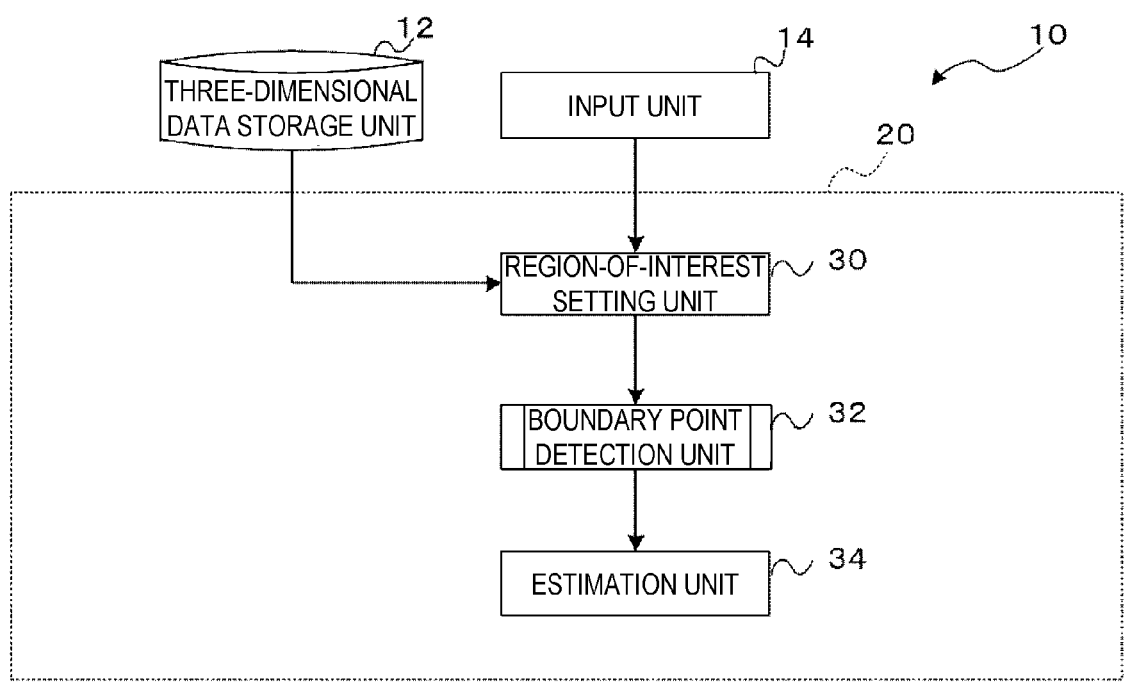
FIG. 7 is a block diagram illustrating an example of a functional configuration of a point cloud analysis device according to a first embodiment.

FIG. 7 is a block diagram illustrating an example of a functional configuration of a point cloud analysis device 10 according to a first embodiment. The point cloud analysis device 10 is an example of an estimation device.

As illustrated in FIG. 7, the point cloud analysis device 10 includes a calculation unit 20, a three-dimensional data storage unit 12, and an input unit 14.

The three-dimensional data storage unit 12 is a device that stores point cloud information. Here, a three-dimensional point cloud is assumed to be data that is installed in a moving body like a fixed laser sensor or MMS and obtained by measuring a point cloud representing a three-dimensional point on an object while scanning a measurement position. A measurement sensor may be a device capable of measuring a distance between a subject and the sensor, such as a laser range finder, an infrared sensor, or an ultrasonic sensor.

A measurement system mounted in a moving body is, for example, a system in which a laser range finder is mounted in a car equipped with a GPS or in an airplane equipped with a GPS, and measurement is performed while the car or the airplane is moving, thereby measuring a three-dimensional position of a surface of a subject that is a feature in an outdoor environment such as a cable, a building, a guardrail, or a road surface. In the first embodiment, data input to the three-dimensional data storage unit 12 is a three-dimensional point cloud that is a measurement result of measuring a position on a surface of the object serving as the subject using an MMS with a GPS and a laser range finder mounted on a vehicle. In the first embodiment, the object serving as the subject is a utility pole, a cable, another branch line related to the utility pole, and a structure near the utility pole.

Further, the three-dimensional data storage unit 12 holds each of the wire models representing the cables obtained from the acquired point cloud.

The wire model is an Nth-order polynomial or spline curve present in a three-dimensional space, or a piecewise smooth continuous line. Mathematically, the wire model is a continuous line segment that cannot be differentiated in some sections and is, for example, y=lxi (absolute value) that cannot be differentiated at an origin.

The wire model is represented as a central axis of the cable by a continuous line with two endpoints. The wire model is defined as a model in which two endpoints can be determined on the central axis, and a physical value such as a three-dimensional position or a ground height of the wire model can be uniquely determined using only one parameter according to a distance from one endpoint. Here, in the wire model, it is not necessary to distinguish between a start point and an end point among the endpoints, and it is only required that the two endpoints can be set on the central axis. A wire model can be detected for the three-dimensional point cloud, for example, using Non Patent Literature 2. Hereafter, a method of detecting the division boundary point position in the wire model, in which a thickness of the cable is ignored, a central axis of the cable is represented as a wire model, and the wire model detected in advance from the point cloud is stored in the three-dimensional data storage unit 12, will be described.

In the embodiment of the present invention, the wire model corresponds to one cable hung in a certain utility pole section. That is, a cable deformed by a tension or the like or a cable that is not deformed is represented by a wire model. For example, when the cable of interest is deformed due to an intermediate branch cable, the cable is represented by two quadratic curves. There is a restriction that the wire model is formed of the two quadratic curves, and the three-dimensional positions of the two model endpoints match at the division boundary point position.

For example, a deformed cable is represented by a wire model formed of a plurality of quadratic curves, and an undeformed cable is represented by a wire model formed of one quadratic curve. The number of quadratic curves that are formed is determined by the division boundary points, and the quadratic curves forming the same wire model are discontinuous at the connection position. That is, the wire model is a line segment having two endpoints formed of one quadratic curve or a plurality of quadratic curves.

The input unit 14 is a user interface such as a mouse or a keyboard, and receives parameters that are used in the point cloud analysis device 10 as inputs. The parameter is, for example, information for collating a model of, for example, a utility pole position and a cable position obtained in advance with a point cloud. Further, the input unit 14 may be an external storage medium such as a Universal Serial Bus (USB) memory in which measurement information is stored.

The calculation unit 20 includes a region-of-interest setting unit 30, a boundary point detection unit 32, and an estimation unit 34.

The calculation unit 20 performs the following process on each of the wire models stored in the three-dimensional data storage unit 12.

The region-of-interest setting unit 30 sets the region of interest obtained for a wire model including a quadratic curve model representing the cable, which has been obtained from a point cloud consisting of three-dimensional points on the object by window-searching the wire model, in which the region of interest is a region of interest divided into a first region and a second region.

Here, the region of interest is a region having a certain size, which has been set by the user, for searching for a position at which the cable is deformed due to a tensile tension or the like. Specifically, for endpoints of a wire model representing a certain cable, the region of interest is set while the region of interest is being shifted at regular intervals from one endpoint to a position of the other endpoint.

For a two-dimensional image analysis process, window search corresponds thereto. In this scheme, because a position of the detection target is unknown, this corresponds to setting a certain region ROI (Region of Interest) set by the user in various regions of an input image. In the embodiment of the present invention, because the division boundary point is on the cable, it is sufficient to set this ROI between endpoints of the wire model representing the cable.

Figure 8:
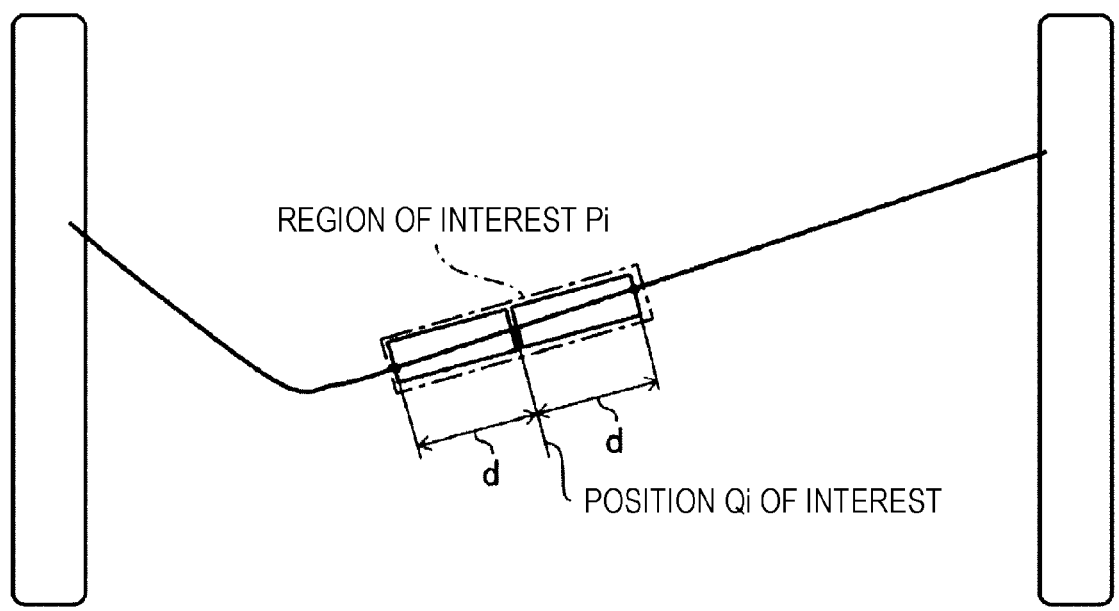
FIG. 8 is a diagram illustrating an example of a first region and a second region into which a region of interest is divided.
Figure 9:
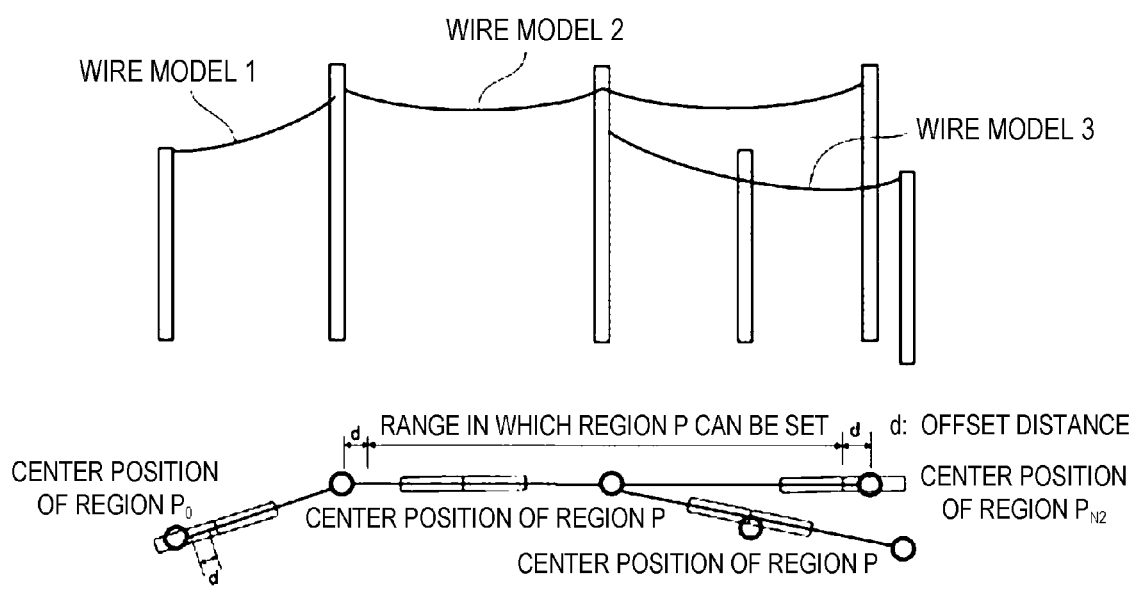
FIG. 9 is a diagram illustrating an example of a setting range of a region of interest for each quadratic curve model.

FIG. 8 is a diagram illustrating an example of a first region and a second region into which the region of interest is divided. As illustrated in FIG. 8, for the position $Q_i$ of interest on the cable, a distance d from $Q_i$ is set as a region $P_i$ of interest. The region of interest $P_i$ is divided into a first region $p_{i1}$ and a first region $p_{i2}$. FIG. 9 is a diagram illustrating an example of a setting range of the region of interest for each wire model. As illustrated in FIG. 9, the region of interest is set in a range obtained by subtracting a distance $2d$ from the endpoint.

The boundary point detection unit 32 compares information on the first region with information on the second region based on the point cloud included in the region of interest and the wire model for each of the regions of interest to calculate a degree of division boundary indicating a degree to which a division position between the first region and the second region of the region of interest is a branch point of the cable. Further, the boundary point detection unit 32 detects the division boundary point that is a branch point of the cable represented by the quadratic curve model based on the degree of division boundary calculated for each of the regions of interest.

Figure 10:
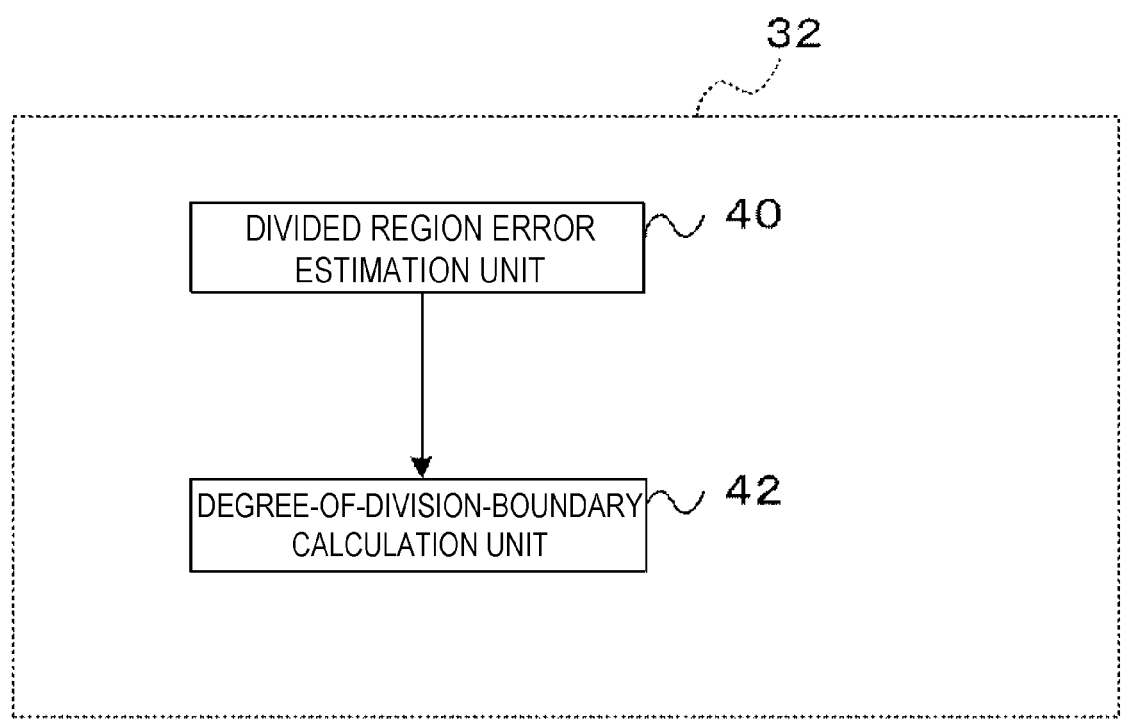
FIG. 10 is a diagram illustrating an example of a configuration of a boundary point detection unit according to the first embodiment.

FIG. 10 is a diagram illustrating an example of a configuration of the boundary point detection unit 32 of the first embodiment. As illustrated in FIG. 10, the boundary point detection unit 32 includes a divided region error estimation unit 40 and a degree-of-division-boundary calculation unit 42.

A principle of detecting the division boundary point in the boundary point detection unit 32 will be described herein. In the first embodiment, there are methods shown as realization scheme 1 or realization scheme 2 below, and the degree of division boundary that is obtained from the shape of the cable in the region of interest $P_i$ is estimated and determined to be a division boundary point by threshold processing.

For example, there are realization scheme 1 and realization scheme 2 below using an error obtained in the first region or the second region, and either of the schemes may be used. In the first embodiment, realization scheme 2 is used.

Realization scheme 1 is a quadratic curve model obtained from either the first region or the second region, as shown in Equation (4) below, and a degree of division boundary is obtained as a model approximation error E representing a percentage at which a cable shape in the other region can be estimated. A correlation is considered to be high if a shape of a cable (point cloud on the cable) in the other region can be predicted using the quadratic curve model estimated from one region. That is, for each of the two regions, a higher degree of division boundary is output when an approximation error of the point cloud when the curve model obtained from the other region is used is greater.

This means that, when it is more difficult to predict a shape of one region from the other region, the degree of division boundary is higher. That is, this means that shapes of the cables present in both regions are correlated so that one region can be estimated from the other region, that is, deformation does not occur at a boundary point position of the region of interest.

When all point clouds in the region of interest at the position $Q_i$ are $P_i$, point clouds in the region of interest 1 are $p_{i1}$, and point clouds in the region of interest 2 are $p_{i2}$, the degree of division boundary can be obtained as in Equation E below.

[Math. 11]

$$E(P_i; M_{i1}, M_{i2}) = \max \begin{pmatrix} \frac{1}{N2}\sum_{s=1}^{N2} (\varsigma(p_{i2}; M_{i1})), \\ \frac{1}{N1}\sum_{t=1}^{N1} (\varsigma(p_{i1}; M_{i2})) \end{pmatrix} \quad (4)$$

Here, $\varsigma(p_{i1}; M_{i2})$ is an error between the point $p_{i1}$ included in the first region and the quadratic curve model $M_{i2}$ obtained from the point cloud included in the second region. In other words, this is an error between the quadratic curve in the first region estimated from the quadratic curve model $M_{i2}$ and the point $p_{i1}$ in the first region.

$\varsigma(p_{i2}; M_{i1})$ is an error between the point $p_{i2}$ included in the second region and the quadratic curve model $M_{i1}$ obtained from the point cloud included in the first region. In other words, this is an error between the quadratic curve in the second region estimated from the quadratic curve model $M_{i1}$ and the point $p_{i2}$ in the second region.

N2 is the number of point clouds included in the second region. N1 is the number of point clouds included in the first region.

In realization scheme 2, the model approximation error is obtained by subtracting a greater of a first error and a second error from the region-of-interest error, as shown in Equation (5) below. The region-of-interest error is an error between the quadratic curve model obtained from the point cloud included in the region of interest and the point cloud included in the region of interest. The first error is an error between the quadratic curve model obtained from the point cloud included in the first region and the point cloud included in the first region. The second error is an error between the quadratic curve model obtained from the point cloud included in the second region and the point cloud included in the second region.

[Math. 12]

$$E(P_i; M_{i1}, M_{i2}) = \frac{1}{N}\sum_{s=1}^{N} (\varsigma(p_i; M_i)) - \max\left(\frac{1}{N}\sum_{s=1}^{N1} (\varsigma(p_{i1}; M_{i1})), \frac{1}{N2}\sum_{t=1}^{N2} (\varsigma(p_{i2}; M_{i2}))\right) \quad (5)$$

When an amount of deformation of the cable of interest is large due to generation of a high tension in an intermediate branch or the like, the first error and the second error are smaller than the region-of-interest error. For Equation (5), an average of the first error and the second error may be subtracted from the region-of-interest error instead of Max.

The reason for taking whichever difference between the first error and the second error is greater (max value) is to deal with, for example, a case in which there is a small accessory in either region. In this case, it is conceivable that the approximation error becomes small in only one region and a deviation from the region-of-interest error becomes large. Thus, the difference is calculated using an average value or a max value in order to curb a determination that there is a division boundary point even though there is substantially no deformation. It is necessary to curb an influence of a measurement error, accessories, or the like in order to estimate the presence or absence of deformation from the approximation error.

As described above, the divided region error estimation unit 40 according to the present embodiment estimates the region-of-interest error, the first error, and the second error, as will be described below. Here, the region-of-interest error is an error between the quadratic curve model obtained from the point cloud included in the region of interest and the point cloud included in the region of interest. The first error is an error between the quadratic curve model obtained from the point cloud included in the first region and the point cloud included in the first region. The second error is an error between the quadratic curve model obtained from the point cloud included in the second region and the point cloud included in the second region.

The degree-of-division-boundary calculation unit 42 calculates the degree of division boundary based on the model approximation error that is a difference between the region-of-interest error and the greater of the first error and the second error according to Equation (5) above.

The boundary point detection unit 32 detects a position at which the degree of division boundary has a peak, as a division boundary point that is the division point of the cable represented by the quadratic curve model, based on the degree of division boundary calculated for each of the regions of interest by the degree-of-division-boundary calculation unit 42.

The estimation unit 34 estimates a slack level and a tension of the cable represented by the quadratic curve model for each divided region for the cable divided at the detected division boundary point. For example, when the number of detected division boundary points is two, the cable is represented by three quadratic curves. A quadratic curve model is estimated for each region of the divided cable, and the slack level and the tension are calculated from the estimated model.

Hereinafter, the cable in each region divided by the division boundary point position is referred to as a sub-cable, and a sub-quadratic curve that is a quadratic curve corresponding to the sub-cable is fitted to each sub-cable to estimate the slack level.

Here, a method of estimating a sub-cable model will be described as an example of post-processing of detecting a position of Q at the division boundary point.

When there is a division boundary point in a certain cable of interest and the concentrated load P due to the service line or the like is unknown, it is necessary to obtain coefficients $\alpha$ and $\beta$ of a tension estimation equation.

Figure 11:
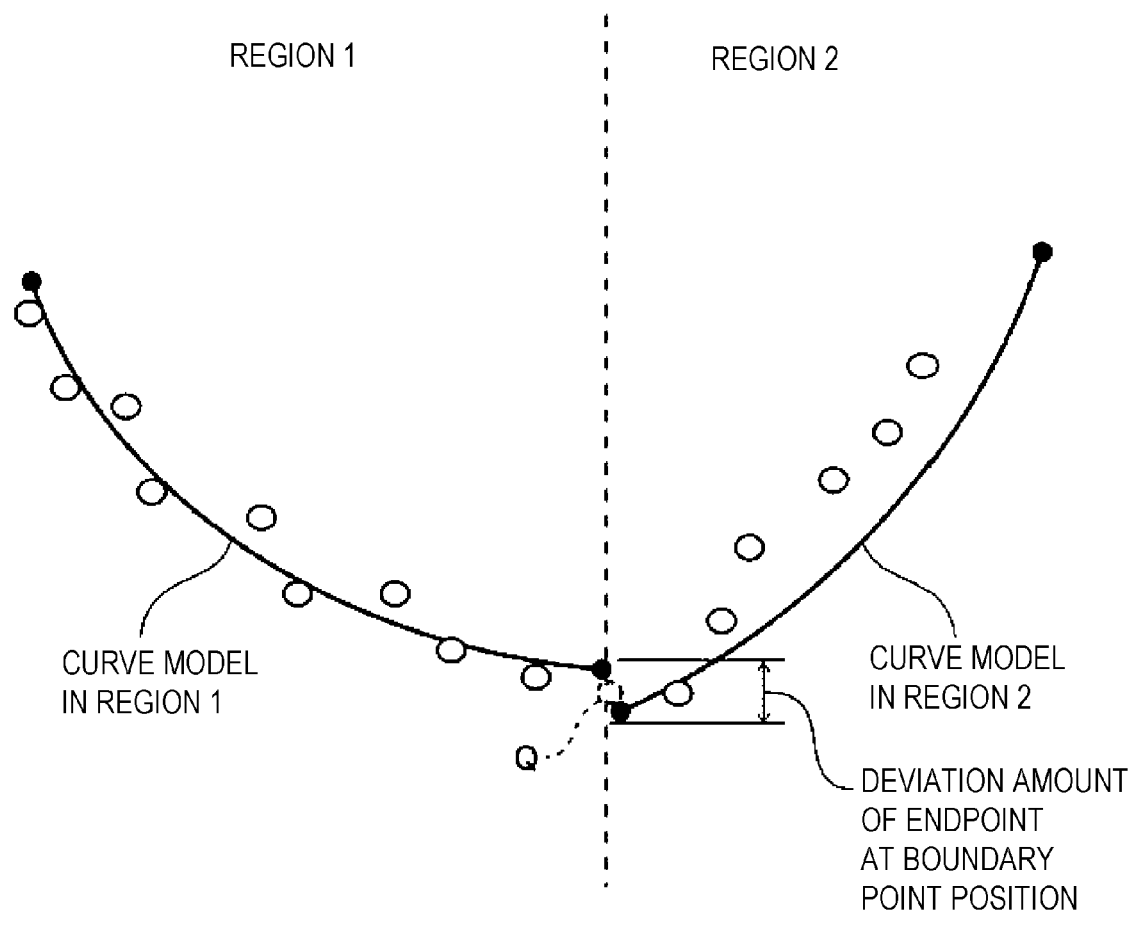
FIG. 11 is a diagram illustrating a positional relationship between endpoints at a division boundary point position.

The model parameters of the sub-quadratic curve in the sub-cable can be implemented by the related art. However, when the sub-cable is detected for each region, susceptibility to measurement noise is as high as an amount of measurement data (point cloud) in the region is reduced, and coefficient estimation accuracy tends to deteriorate. Thus, in the sub-curve model obtained for each region, a constrained model fitting is performed so that there is no positional deviation between endpoints at a position of the division boundary point. FIG. 11 is a diagram illustrating a positional relationship between the endpoints at the division boundary point position. A broken line circle in FIG. 11 is a position of the estimated division boundary point Q (a point on the wire model).

That is, for adjacent quadratic curves at the division boundary point position, a constraint term may be set in an evaluation function so that a deviation amount of the position of the division boundary point Q becomes very small and the model parameter may be estimated.

For example, when a shortest distance from a position of a certain division boundary point position $Q_k$ is larger than a threshold value, a penalty term E is set as follows so that a value of a model evaluation function becomes smaller.

[Math. 13]

$$J(P;\tilde{M}_1,\tilde{M}_2)=\mathrm{argmax}(\Sigma_{j=1}^{N1}\varsigma(p_{j,1};M_1)+\Sigma_{i=1}^{N2}\varsigma(p_{j,2};M_2)+E(q_{M1},q_{M2};M_1,M_2)) \quad (6)$$

Here, $\varsigma(p_{j,1};M_1)$ is a function that outputs 1 when a distance between the point cloud $p_{j1}$ ($\in$P) (total number N1) present in region 1 and a curve model M1 is equal to or smaller than a threshold value $\varepsilon$, and 0 otherwise.

$\varsigma(p_{j,2};M_2)$ is a function that outputs 1 when a distance between the point cloud $p_{j2}$ ($\in$P) (total number N2) present in region 2 and a curve model M2 is equal to or smaller than the threshold value $\varepsilon$, and 0 otherwise. i is a number that distinguishes between the points, and N1+N2 is a total number of point clouds P in the two regions.

$(M_1,M_2)$

E means a penalty term, and is a function that outputs a negative infinity when a distance between positions qM1 and qM2 at the division boundary point positions of the two curve models M1 and M2 is equal to or greater than a threshold value $\zeta$ [m]. An evaluation function J is a model with high approximation accuracy of each region, and two sub-curve models with little deviation of a model position at the division boundary point position can be obtained.

Here, a length d [m] and a threshold value $\zeta$ [m] of the region of interest are parameters that are experimentally determined, and d=2.0 and $\zeta$=0.01 in the embodiment of the present invention.

Figure 12:
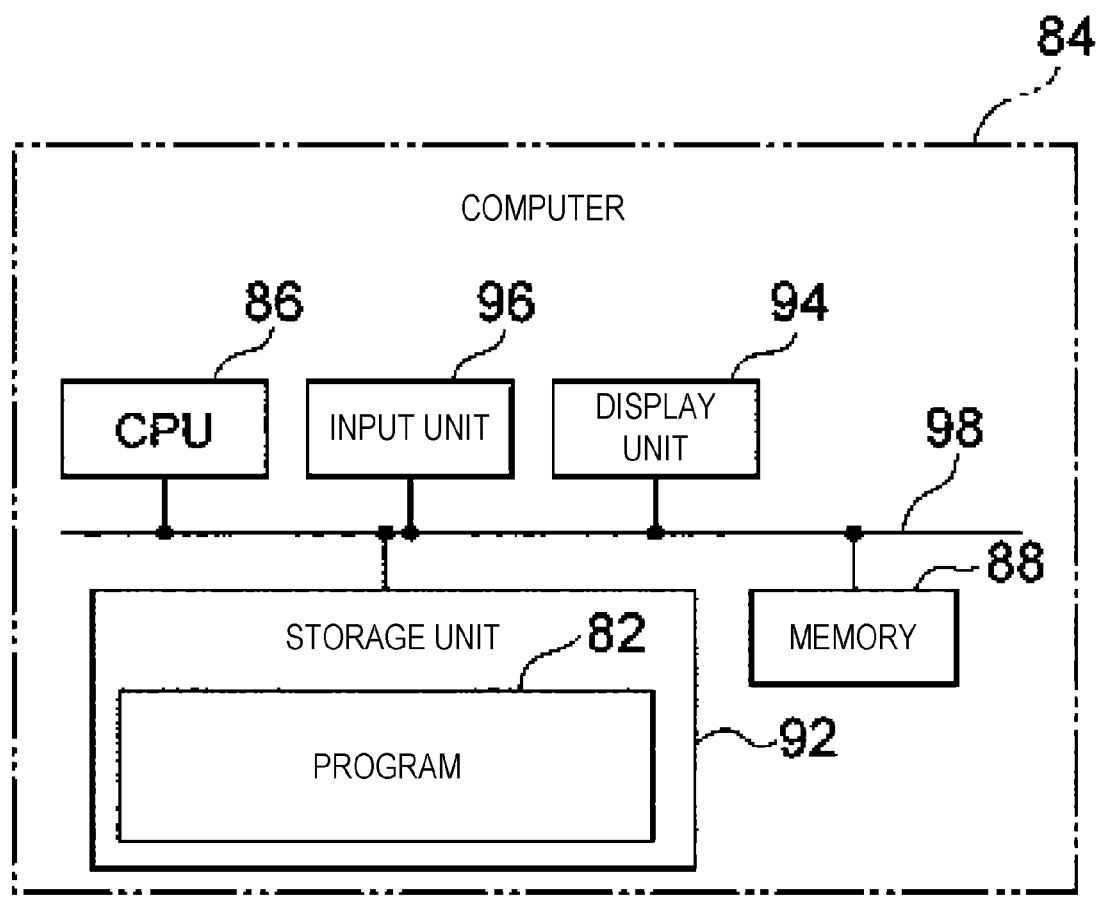
FIG. 12 is a schematic block diagram illustrating an example of a computer functioning as a point cloud analysis device.

FIG. 12 is a schematic block diagram illustrating an example of a computer functioning as a point cloud analysis device. The point cloud analysis device 10 is realized by a computer 84 illustrated in FIG. 12 as an example. The computer 84 includes a CPU 86, a memory 88, a storage unit 92 that stores a program 82, a display unit 94 that includes a monitor, and an input unit 96 that includes a keyboard or a mouse. The CPU 86, the memory 88, the storage unit 92, the display unit 94, and the input unit 96 are connected to each other via the bus 98.

The storage unit 92 is realized by an HDD, SSD, flash memory, or the like. The program 82 for causing the computer 84 to function as the point cloud analysis device 10 is stored in the storage unit 92. The CPU 86 reads the program 82 from the storage unit 92, loads the program 82 into the memory 88, and executes the program 82. The program 82 may be stored in a computer-readable medium and provided.

Operation of Point Cloud Analysis Device According to First Embodiment

Figure 13:
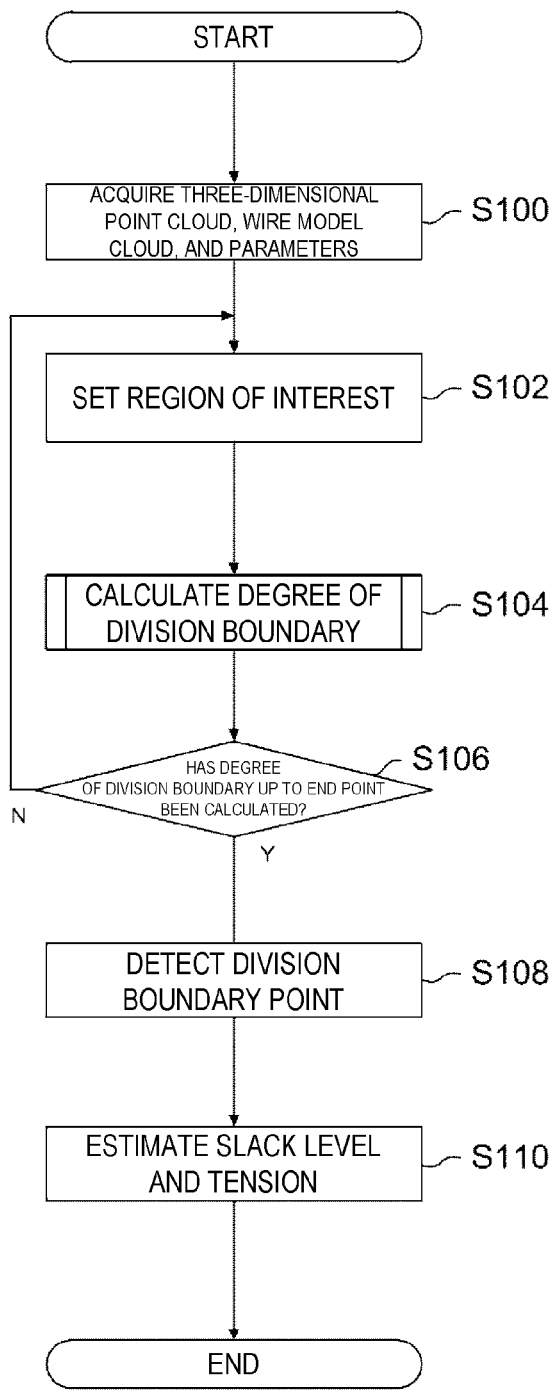
FIG. 13 is a flowchart illustrating an example of a flow of a process in a program according to the first embodiment.

Next, an operation of the point cloud analysis device 10 according to the first embodiment will be described with reference to FIG. 13. FIG. 13 is a flowchart illustrating an example of a flow of a process in the program 82 according to the first embodiment.

When the point cloud analysis device 10 according to the first embodiment is instructed to execute a point cloud analysis process through an operation of an operator, the CPU 86 reads out and executes the program 82 stored in the storage unit 92. The following processes are executed for the wire model. Further, the following processes that are executed for each quadratic curve model can be calculated in parallel in the program 82.

First, in step S100, the region-of-interest setting unit 30 acquires the three-dimensional point cloud, a wire model cloud representing the cable, and the parameters obtained in advance and input from the input unit 14.

In step S102, the region-of-interest setting unit 30 sets the region of interest obtained by window-searching the wire model in a region between a start point and an end point of the wire model, in which the region of interest is a region of interest $P_i$ divided into a first region and a second region. The region of interest $P_i$ is set to move at a predetermined interval Dstep [m] between the start point and the end point of the quadratic curve model. Here, Dstep is a parameter that may be determined experimentally, and in the embodiment, Dstep=0.1.

In step S104, the boundary point detection unit 32 compares the information on the first region with the information on the second region based on the point cloud included in the region of interest and the quadratic curve model for each of the regions of interest to calculate the degree of division boundary.

In step S106, the boundary point detection unit 32 determines whether the degree of division boundary has been calculated up to the end point (wire model endpoint) for the quadratic curve model, proceeds to step S108 when the process ends up to the end point, and returns to step S102 to set the next region of interest $P_i$ and repeat the process when the process does not end up to the end point.

In step S108, the boundary point detection unit 32 sets regions of interest on the wire model and detects a division boundary point from a degree of division boundary obtained in each of the regions of interest. A degree of division boundary at a position at which a concentrated load is generated is output as a great value, and a center position $Q_i$ of the region of interest $P_i$ is detected as the division boundary point. Here, a maximum value is, for example, a point at which the peak as illustrated in FIG. 6 is generated.

In step S110, the estimation unit 34 estimates a sub-quadratic curve model from the region divided at the detected division boundary point, and estimates the slack level and the tension from parameters of the curve model.

Figure 14:
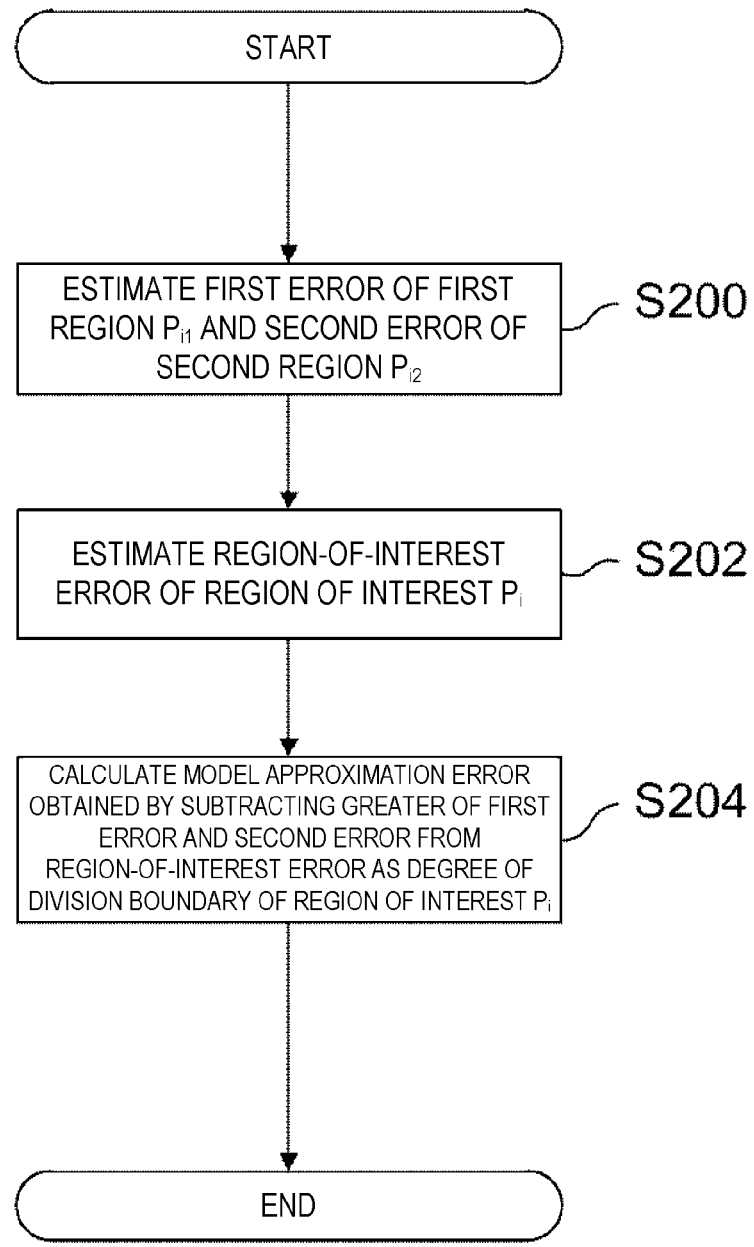
FIG. 14 is a flowchart illustrating an example of a flow of a process of calculating a degree of division boundary according to the first embodiment.

Next, details of the process in step S104 will be described. FIG. 14 is a flowchart illustrating an example of a flow of a process of calculating a degree of division boundary according to the first embodiment.

In step S200, the divided region error estimation unit 40 estimates a first error between the first region Pu and the region of interest $P_i$ and a second error between the second region $P_{i2}$ and the region of interest $P_i$. Specifically, the first error between the quadratic curve model $M_{i1}$ obtained from the point cloud included in the first region and the point cloud included in the first region Pu and the second error between the quadratic curve model $M_{i2}$ obtained from the point cloud included in the second region and the point cloud included in the second region $P_{i2}$ are estimated.

In step S202, the divided region error estimation unit 40 estimates a region-of-interest error of the region of interest $P_i$ for the region of interest $P_i$. Specifically, the region-of-interest error between the quadratic curve model $M_i$ obtained from the point cloud in the region of interest and the point cloud included in the region of interest $P_i$ is estimated.

In step S204, the degree-of-division-boundary calculation unit 42 calculates the model approximation error obtained by subtracting the greater of the first error and the second error from the region-of-interest error according to Equation (5) above, as the degree of division boundary of the region of interest $P_i$.

As described above, the point cloud analysis device 10 according to the first embodiment compares the information on the first region with the information on the second region based on the point cloud included in the region of interest and the quadratic curve model for each of the regions of interest, calculates the degree of division boundary representing a degree to which a division position between the first region and the second region of the regions of interest is the branch point of the cable, and detects the division boundary point that is a branch point of the cable represented by the quadratic curve model based on the degree of division boundary calculated for each of the regions of interest. Thus, it is possible to detect the division boundary point that serves as a reference for estimating the slack level.

Further, the divided region error estimation unit 40 described above may estimate the first error and the second error as will be described below, and the degree-of-division-boundary calculation unit 42 may calculate the degree of division boundary based on the model approximation error that is the greater of the first error and the second error according to Equation (4) above. Here, the first error is an error between the quadratic curve model obtained from the point cloud included in the first region and the point cloud included in the second region. The second error is an error between the quadratic curve model obtained from the point cloud included in the second region and the point cloud included in the first region.

Second Embodiment

In the first embodiment, the calculation of the degree of division boundary is performed based on a magnitude of the approximation error, whereas in a second embodiment, the calculation of the degree of division boundary is realized through machine learning using the feature vector. The same units as those in the first embodiment are denoted by the same reference numerals, and description thereof will be omitted.

Figure 15:
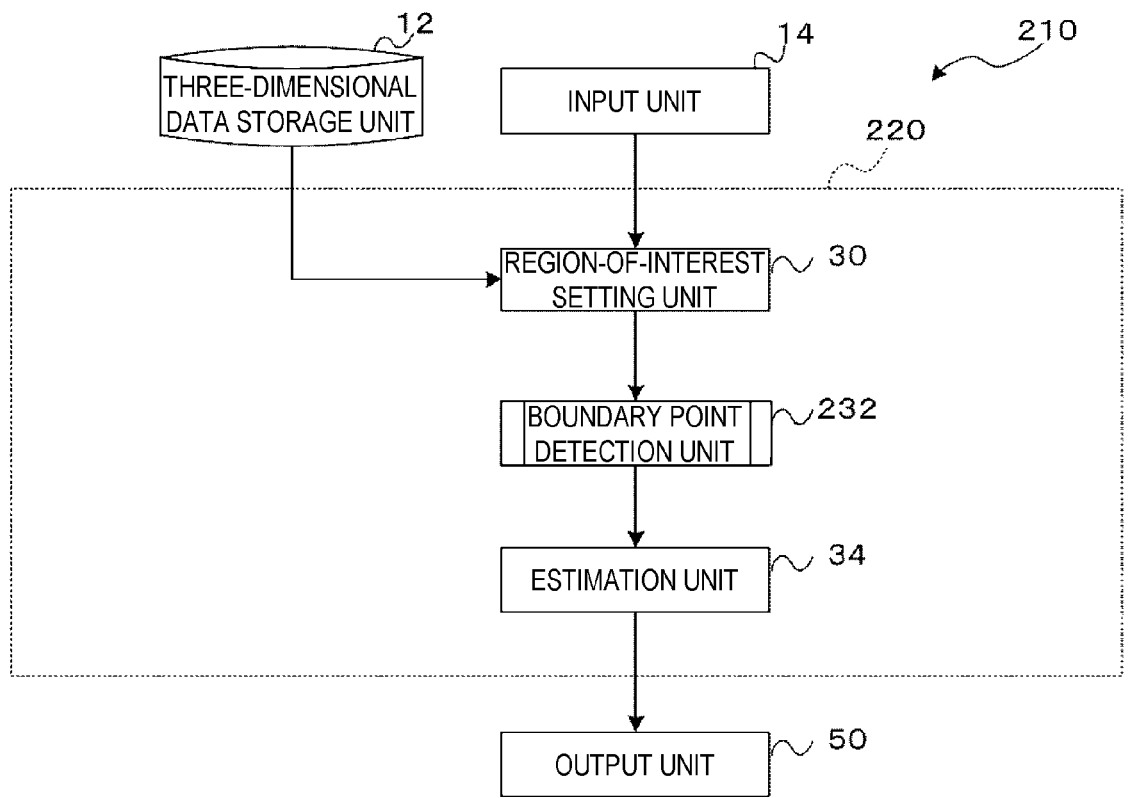
FIG. 15 is a block diagram illustrating an example of a functional configuration of a point cloud analysis device according to a second embodiment.

FIG. 15 is a block diagram illustrating an example of a functional configuration of a point cloud analysis device 210 according to the second embodiment.

A boundary point detection unit 232 obtains a predetermined feature quantity vector for each of the regions of interest, inputs the feature quantity vector to a model for obtaining a pre-learned intermediate branch, and calculates a degree of division boundary.

Figure 16:
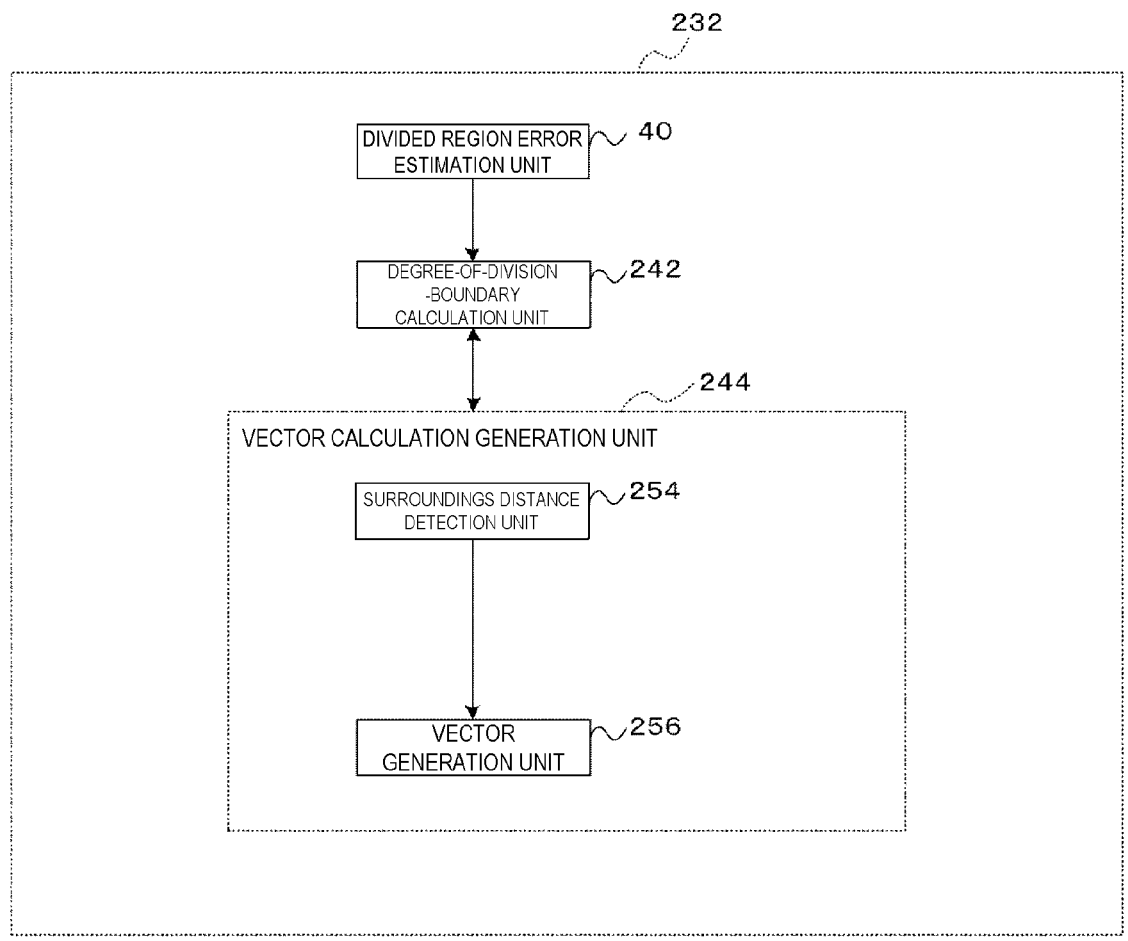
FIG. 16 is a diagram illustrating an example of a configuration of a boundary point detection unit according to the second embodiment.

FIG. 16 is a diagram illustrating an example of a configuration of the boundary point detection unit 232 according to the second embodiment. As illustrated in FIG. 16, the boundary point detection unit 232 includes a divided region error estimation unit 40, a degree-of-division-boundary calculation unit 242, and a vector calculation generation unit 244. The vector calculation generation unit 244 includes a surrounding distance detection unit 254 and a vector generation unit 256.

The vector calculation generation unit 244 calculates surroundings information representing a distance between a surrounding quadratic curve model of the region of interest and the region of interest, and generates a feature quantity vector including a model approximation error and surroundings information.

Specifically, the feature quantity vector is generated by concatenating feature quantities of (1) to (3) below. (1) is a feature quantity regarding shape deviation, and (2) and (3) are feature quantities for a relative positional relationship with surrounding structures. The surroundings information is the feature quantity of (2) and (3). For the concatenation of the feature quantities, the feature quantities may be all combined or the feature quantities may be selectively combined.

(1) The model approximation error obtained using the same scheme as that for the boundary point detection unit 32 of the first embodiment, and each of the numbers of points included in the first region and the second region of the region of interest are used as feature quantities. When there is no intermediate branch, there is no deformation of the quadratic curve, and it is possible to estimate a shape of one region from any one of point cloud information (model) of the first region and the second region. The model approximation error obtained using Equation (5) above increases as the quadratic curve is deformed. Thus, when the deformation is larger, a probability of the intermediate branch being present increases.

(2) A shortest distance between an extension line segment of an endpoint of a surrounding cable and a center position is a feature quantity. The extension line segment is a curve or a straight line. When the line segment is the straight line, a perpendicular line drawn from the center position of the region of interest with respect to the line segment is the shortest distance. When there is an intermediate branch, an external nearby cable such as a service line is present, and the external cable and a cable of interest often intersect each other. Due to characteristics of MMS measurement, a point cloud near an intersection is often lost due to an influence of occlusion, but the service line (external cable) is extended for the loss part such that the model can be brought closer to the intersection or the cable. When the shortest distance is shorter, a possibility of an intermediate branch being present is higher.

(3) is a feature quantity of the distance between the endpoint of the surrounding cable and the center position of the region of interest. Similar to the reason in (2) above, even when there is a point cloud loss near an intersection position of the external cable and the cable of interest, an endpoint of the external cable is often present near the cable in a case in which there is an intermediate branch. That is, the possibility of the intermediate branch being present is high when there is a surrounding cable endpoint in the vicinity.

The surrounding distance detection unit 254 detects a shortest distance between a line segment obtained by extending an endpoint of a surrounding quadratic curve model with respect to the region of interest and the center position of the region of interest as surroundings information for each region of interest. Further, the surrounding distance detection unit 254 detects a distance between the endpoint of the surrounding quadratic curve model and the center position of the region of interest as surroundings information.

The vector generation unit 256 generates a feature quantity vector including the model approximation error and the surroundings information for each of the regions of interest.

The degree-of-division-boundary calculation unit 242 calculates the degree of division boundary for each of the regions of interest using a predetermined machine learning scheme based on the feature quantity vector generated by the vector generation unit 256. The machine learning scheme may be any scheme such as logistic regression analysis and rank learning such as AdaRank and RankNet. A model for machine learning that is used for calculation of the degree of division boundary may be learned in advance using learning data in which a correct label is attached to the feature quantity vector. Further, because the model approximation error includes the number of point clouds in each of the first region and the second region, the degree-of-division-boundary calculation unit 242 acquires the number of point clouds in each region.

Operation of Point Cloud Analysis Device According to Second Embodiment

Next, an operation of the point cloud analysis device 210 according to the second embodiment will be described. The flow of a process in the program 82 according to the second embodiment is the same as the flowchart showing an example of FIG. 13 of the first embodiment, and in step S108, the degree-of-division-boundary calculation unit 242 calculates the degree-of-division-boundary using a predetermined machine learning scheme based on the feature quantity vector generated by the vector generation unit 256.

Figure 17:
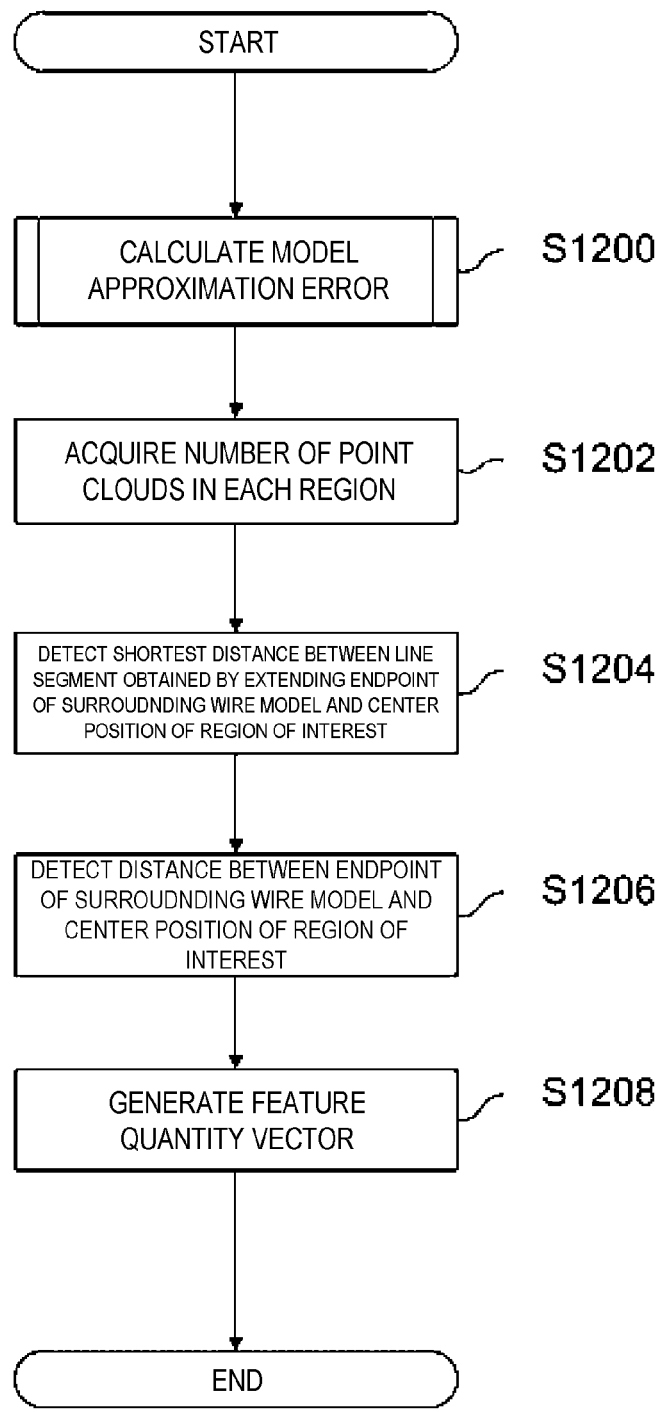
FIG. 17 is a flowchart illustrating an example of a flow of a process of calculating a degree of division boundary according to the second embodiment.

In the second embodiment, the process of calculating the degree of division boundary in step S104 differs from that in the first embodiment. FIG. 17 is a flowchart illustrating an example of a flow of a process of calculating the degree of division boundary according to the second embodiment.

In step S1200, the divided region error estimation unit 40 and the degree-of-division-boundary calculation unit 242 calculate the model approximation error of the region of interest. The model approximation error is calculated by performing the same processes as those in steps S200 to 204 of FIG. 14.

In step S1202, the degree-of-division-boundary calculation unit 242 acquires the number of point clouds in each of the first region and the second region for the region of interest.

In step S1204, the surrounding distance detection unit 254 detects a shortest distance between a line segment obtained by extending an endpoint of a surrounding quadratic curve model with respect to the region of interest and the center position of the region of interest as surroundings information.

In step S1206, the surrounding distance detection unit 254 detects a distance between the endpoint of the surrounding quadratic curve model and the center position of the region of interest as surroundings information.

In step S1208, the vector generation unit 256 generates a feature quantity vector including a model approximation error including the number of point clouds in each region, and surroundings information.

As described above, in the point cloud analysis device 10 according to the second embodiment, the boundary point detection unit 32 generates the feature quantity vector including the model approximation error and the surroundings information for each of the regions of interest, calculates the degree of division boundary using a predetermined machine learning scheme, and detects the division boundary point that is the branch point of the cable represented by the quadratic curve model based on the degree of division boundary calculated for each of the regions of interest. This makes it possible to estimate the slack level accurately in consideration of the shape of the deformed cable.

Further, the feature quantity vector includes a feature quantity of a relative positional relationship with a surrounding structure. This makes it possible to estimate the slack level in consideration of the surrounding structure.

The point cloud analysis device and the method have been illustrated and described above as embodiments. The embodiment may be in the form of a program for causing the computer to function as each unit included in the point cloud analysis device. The embodiment may be in the form of a storage medium that can be read by a computer that stores this program.

In addition, the configuration of the point cloud analysis device described in the embodiment is an example, and may be changed depending on a situation in a range that does not depart from the gist.

Further, the flow of the process of the program described in the embodiment is also an example, and unnecessary steps may be deleted, new steps may be added, or a processing order may be changed in a range that does not depart from the gist.

Further, in the embodiment, the case in which the process according to the embodiment is realized by a software configuration using the computer by the program being executed has been described, but the present invention is not limited thereto. The embodiment may be realized by, for example, a hardware configuration or a combination of a hardware configuration and a software configuration.

REFERENCE SIGNS LIST

10 Point cloud analysis device
12 Three-dimensional data storage unit
14 Input unit
20 Calculation unit
30 Region-of-interest setting unit
32 Boundary point detection unit
34 Estimation unit
40 Divided region error estimation unit
42 Degree-of-division-boundary calculation unit
210 Point cloud analysis device
232 Boundary point detection unit
242 Degree-of-division-boundary calculation unit
244 Vector calculation generation unit
254 Surrounding distance detection unit
256 Vector generation unit

The invention claimed is:

1. A point cloud analysis device comprising:
a region-of-interest determiner configured to set a plurality of regions of interest obtained by window-searching a wire model including a quadratic curve model representing a cable obtained from a point cloud consisting of three-dimensional points on an object, the region of interest being divided into a first region and a second region; and
a boundary point detector configured to:
compare information on the first region with information on the second region based on a point cloud included in the region of interest and the quadratic curve model for each of the plurality of regions of interest,
determine, based at least on a distance between the wire model around the region of interest and the region of interest using a predetermined machine learning, a degree of division boundary representing a degree to which a division position between the first region and the second region of each of the plurality of regions of interest is a branch point of the cable, and
detect a division boundary point that is a branch point of a cable represented by the wire model based on the degree of division boundary determined for each of the plurality of regions of interest.

2. The point cloud analysis device according to claim 1, further comprising:
an estimator configured to estimate a slack level of the cable represented by the wire model for each of the wire models divided at the detected division boundary point.

3. The point cloud analysis device according to claim 2, wherein the boundary point detector includes a divided region error estimator and a degree-of-division-boundary determiner,
the divided region error estimator estimates a first error and a second error, the first error being an error between a quadratic curve model obtained from a point cloud included in the first region and a point cloud included in the second region, and a second error being an error between a quadratic curve model obtained from the point cloud included in the second region and the point cloud included in the first region, and
the degree-of-division-boundary determiner determines the degree of division boundary based on a model approximation error that is the greater of the first error and the second error.

4. The point cloud analysis device according to claim 2, wherein the boundary point detector includes a divided region error estimator and a degree-of-division-boundary determiner,
the divided region error estimator estimates a region-of-interest error, a first error and a second error, the region-of-interest error being an error between a quadratic curve model obtained from the point cloud included in the region of interest and the point cloud included in the region of interest, the first error being an error between a quadratic curve model obtained from a point cloud included in the first region and the point cloud included in the first region, and the second error being an error between a quadratic curve model obtained from a point cloud included in the second region and the point cloud included in the second region, and
the degree-of-division-boundary determiner determines the degree of division boundary based on a model approximation error that is a difference between the region-of-interest error and an error based on the first error and the second error.

5. The point cloud analysis device according to claim 1, wherein the boundary point detector includes a divided region error estimator and a degree-of-division-boundary determiner,
the divided region error estimator estimates a first error and a second error, the first error being an error between a quadratic curve model obtained from a point cloud included in the first region and a point cloud included in the second region, and a second error being an error between a quadratic curve model obtained from the point cloud included in the second region and the point cloud included in the first region, and
the degree-of-division-boundary determiner determines the degree of division boundary based on a model approximation error that is the greater of the first error and the second error.

6. The point cloud analysis device according to claim 5, wherein the boundary point detector further includes a vector determination generator,
the vector determination generator determines surroundings information representing the distance between the wire model around the region of interest and the region of interest, and generates a feature quantity vector including the model approximation error and the surroundings information, and
the degree-of-division-boundary determiner determines the degree of division boundary using the predetermined machine learning based on the feature quantity vector.

7. The point cloud analysis device according to claim 6, wherein the vector determination generator includes a surrounding distance detector and a vector generator,
the surrounding distance detector detects, as the surroundings information, surrounding distance information including
a shortest distance between a center position of the region of interest and a line segment obtained by extending an endpoint of a surrounding wire model with respect to the region of interest, and a distance between the endpoint of the surrounding wire model and the center position of the region of interest, and the vector generator generates the feature quantity vector including the model approximation error and the surroundings information.

8. The point cloud analysis device according to claim 1, wherein the boundary point detector includes a divided region error estimator and a degree-of-division-boundary determiner, the divided region error estimator estimates a region-of-interest error, a first error and a second error, the region-of-interest error being an error between a quadratic curve model obtained from the point cloud included in the region of interest and the point cloud included in the region of interest, the first error being an error between a quadratic curve model obtained from a point cloud included in the first region and the point cloud included in the first region, and the second error being an error between a quadratic curve model obtained from a point cloud included in the second region and the point cloud included in the second region, and the degree-of-division-boundary determiner determines the degree of division boundary based on a model approximation error that is a difference between the region-of-interest error and an error based on the first error and the second error.

9. The point cloud analysis device according to claim 8, wherein the boundary point detector further includes a vector determination generator, the vector determination generator determines surroundings information representing a distance between the wire model around the region of interest and the region of interest, and generates a feature quantity vector including the model approximation error and the surroundings information, and the degree-of-division-boundary determiner determines the degree of division boundary using a predetermined machine learning scheme based on the feature quantity vector.

10. An estimation device for estimating a position on a cable hung between two points to which a force deforming a slack level of the cable is applied, the estimation device comprising:

a determiner configured to set a candidate for the position as a reference and determine a degree to which the candidate for the position is the position from a first region included in a region on one side of the reference and a second region included in a region on the other side of the reference, wherein the degree is obtained based on at least one of an error between the second region and a region estimated to be the second region from the first region using a predetermined machine learning, an error between the first region and a region estimated to be the first region from the second region, and the degree is further based a distance between a wire model around a set of the first region and the second region and the set of the first region and the second region.

11. The estimation device according to claim 10, wherein the region estimated to be the first region from the first region is based at least on a quadratic curve model.

12. A point cloud analysis method comprising:

setting, by a region-of-interest determiner, a plurality of regions of interest obtained by window-searching a wire model including a quadratic curve model representing a cable obtained from a point cloud consisting of three-dimensional points on an object, the region of interest being divided into a first region and a second region; and detecting, by a boundary point detector, a division boundary point that is a branch point of a cable represented by the quadratic curve model based on a degree of division boundary determined, based at least on a distance between the wire model around the region of interest and the region of interest using a predetermined machine learning, for each of the plurality of regions of interest by comparing information on the first region with information on the second region based on a point cloud included in the region of interest and the quadratic curve model for each of the plurality of regions of interest, and determining the degree of division boundary representing a degree to which a division position between the first region and the second region of each of the plurality of regions of interest is a branch point of the cable.

13. The point cloud analysis method according to claim 12, the method further comprising:

estimating, by an estimator, a slack level of the cable represented by the wire model for each of the wire models divided at the detected division boundary point.

14. The point cloud analysis method according to claim 13, wherein the boundary point detector includes a divided region error estimator and a degree-of-division-boundary determiner, the divided region error estimator estimates a first error and a second error, the first error being an error between a quadratic curve model obtained from a point cloud included in the first region and a point cloud included in the second region, and a second error being an error between a quadratic curve model obtained from the point cloud included in the second region and the point cloud included in the first region, and the degree-of-division-boundary determiner determines the degree of division boundary based on a model approximation error that is the greater of the first error and the second error.

15. The point cloud analysis method according to claim 13, wherein the boundary point detector includes a divided region error estimator and a degree-of-division-boundary determiner, the divided region error estimator estimates a region-of-interest error, a first error and a second error, the region-of-interest error being an error between a quadratic curve model obtained from the point cloud included in the region of interest and the point cloud included in the region of interest, the first error being an error between a quadratic curve model obtained from a point cloud included in the first region and the point cloud included in the first region, and the second error being an error between a quadratic curve model obtained from a point cloud included in the second region and the point cloud included in the second region, and the degree-of-division-boundary determiner determines the degree of division boundary based on a model approximation error that is a difference between the region-of-interest error and an error based on the first error and the second error.

16. The point cloud analysis method according to claim 12, wherein the boundary point detector includes a divided region error estimator and a degree-of-division-boundary determiner, the divided region error estimator estimates a first error and a second error, the first error being an error between a quadratic curve model obtained from a point cloud included in the first region and a point cloud included in the second region, and a second error being an error between a quadratic curve model obtained from the point cloud included in the second region and the point cloud included in the first region, and the degree-of-division-boundary determiner determines the degree of division boundary based on a model approximation error that is the greater of the first error and the second error.

17. The point cloud analysis method according to claim 16, wherein the boundary point detector further includes a vector determination generator, the vector determination generator determines surroundings information representing the distance between the wire model around the region of interest and the region of interest, and generates a feature quantity vector including the model approximation error and the surroundings information, and the degree-of-division-boundary determiner determines the degree of division boundary using a predetermined machine learning based on the feature quantity vector.

18. The point cloud analysis method according to claim 17, wherein the vector determination generator includes a surrounding distance detector and a vector generator, the surrounding distance detector detects, as the surroundings information, surrounding distance information including a shortest distance between a center position of the region of interest and a line segment obtained by extending an endpoint of a surrounding wire model with respect to the region of interest, and a distance between the endpoint of the surrounding wire model and the center position of the region of interest, and the vector generator generates the feature quantity vector including the model approximation error and the surroundings information.

19. The point cloud analysis method according to claim 12, wherein the boundary point detector includes a divided region error estimator and a degree-of-division-boundary determiner, the divided region error estimator estimates a region-of-interest error, a first error and a second error, the region-of-interest error being an error between a quadratic curve model obtained from the point cloud included in the region of interest and the point cloud included in the region of interest, the first error being an error between a quadratic curve model obtained from a point cloud included in the first region and the point cloud included in the first region, and the second error being an error between a quadratic curve model obtained from a point cloud included in the second region and the point cloud included in the second region, and the degree-of-division-boundary determiner determines the degree of division boundary based on a model approximation error that is a difference between the region-of-interest error and an error based on the first error and the second error.

20. The point cloud analysis method according to claim 19, wherein the boundary point detector further includes a vector determination generator, the vector determination generator determines surroundings information representing the distance between the wire model around the region of interest and the region of interest, and generates a feature quantity vector including the model approximation error and the surroundings information, and the degree-of-division-boundary determiner determines the degree of division boundary using a predetermined machine learning based on the feature quantity vector.

* * * * *